(12) United States Patent
Ozeki

(10) Patent No.: US 11,691,236 B2
(45) Date of Patent: Jul. 4, 2023

(54) GRIPPING FORCE ADJUSTMENT DEVICE AND GRIPPING FORCE ADJUSTMENT SYSTEM

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 468 days.

(21) Appl. No.: 16/815,003

(22) Filed: Mar. 11, 2020

(65) Prior Publication Data

US 2020/0290169 A1 Sep. 17, 2020

(30) Foreign Application Priority Data

Mar. 14, 2019 (JP) ................................ 2019-047742

(51) Int. Cl.
*B23Q 15/12* (2006.01)
*B25J 9/16* (2006.01)

(52) U.S. Cl.
CPC .............. *B23Q 15/12* (2013.01); *B25J 9/163* (2013.01); *B25J 9/1633* (2013.01)

(58) Field of Classification Search
CPC . B23Q 15/12; B23Q 3/06; B23Q 17/00; B25J 9/163; B25J 9/1633; G05B 2219/49065; G05B 2219/49132; G05B 2219/49133; G05B 19/18
See application file for complete search history.

(56) References Cited

U.S. PATENT DOCUMENTS

| | | | | |
|---|---|---|---|---|
| 5,240,358 A | * | 8/1993 | Hackett | B23Q 11/0035 409/141 |
| 6,463,835 B1 | * | 10/2002 | Segawa | B23Q 17/005 82/47 |
| 2015/0158097 A1 | * | 6/2015 | Myrfield | B27B 15/04 83/403.1 |
| 2016/0059412 A1 | * | 3/2016 | Oleynik | A47J 36/321 700/250 |
| 2017/0032283 A1 | | 2/2017 | Kamiya | |
| 2018/0107174 A1 | * | 4/2018 | Takahashi | G05B 9/02 |
| 2018/0126558 A1 | * | 5/2018 | Ooba | B25J 19/06 |

(Continued)

FOREIGN PATENT DOCUMENTS

| | | |
|---|---|---|
| JP | H4322933 A | 11/1992 |
| JP | 2000190113 A | 7/2000 |

(Continued)

*Primary Examiner* — Jonathan L Sample
*Assistant Examiner* — Elizabeth Rose Neleski
(74) *Attorney, Agent, or Firm* — Hauptman Ham, LLP

(57) ABSTRACT

During machining of a workpiece, a gripping force adjustment device takes into account the state of the machining and the state of the workpiece in order to set a more appropriate gripping force. The gripping force adjustment device acquires data indicating a machining state implemented by a machine tool and data relating to a gripping state realized on the workpiece by a jig, and creates data to be used in machine learning on the basis of the acquired data. The gripping force adjustment device then executes machine learning processing relating to the gripping force exerted on the workpiece by the jig in the environment in which the machine tool machines the workpiece on the basis of the created data.

16 Claims, 12 Drawing Sheets

(56) References Cited

U.S. PATENT DOCUMENTS

| | | | |
|---|---|---|---|
| 2018/0222046 A1* | 8/2018 | Gotou | B25J 9/1612 |
| 2019/0121319 A1 | 4/2019 | Xia | |
| 2020/0279158 A1* | 9/2020 | Tsunoda | G05B 19/4155 |

FOREIGN PATENT DOCUMENTS

| | | |
|---|---|---|
| JP | 2001-246511 A | 9/2001 |
| JP | 201733239 A | 2/2017 |
| JP | 201976976 A | 5/2019 |
| WO | 2020008633 A1 | 1/2020 |

\* cited by examiner

GRIPPING FORCE ADJUSTMENT DEVICE AND GRIPPING FORCE ADJUSTMENT SYSTEM

RELATED APPLICATIONS

The present application claims priority to Japanese Patent Application Number 2019-047742 filed Mar. 14, 2019, the disclosure of which is hereby incorporated by reference herein in its entirety.

BACKGROUND OF THE INVENTION

1. Field of the Invention

The present invention relates to a gripping force adjustment device and a gripping force adjustment system.

2. Description of the Related Art

When a workpiece is to be machined by a machine tool or the like, the workpiece serving as the machining subject is gripped and fixed by a jig such as a vice or a chuck, whereupon the fixed workpiece is machined by the tool. If the gripping force of the jig weakens at this time, cutting force received from the tool during machining of the workpiece overcomes the gripping force of the jig, causing the workpiece to move and vibrate, and as a result, the machining precision of the workpiece deteriorates. Further, when the workpiece is fixed while laid on its side or the like, the weight of the workpiece itself may overcome the gripping force of the jig, causing the workpiece to move. However, when the gripping force of the jig is strengthened to prevent the workpiece from moving, the workpiece may be distorted or warped by the gripping force or damaged by a chuck pawl or the like, and as a result, the machining precision of the workpiece may deteriorate. It is therefore necessary to set the gripping force applied when the workpiece is gripped by the jig appropriately, i.e. to be strong enough not to be overcome by the cutting force but weak enough not to distort the workpiece. Conventionally, an experienced operator is relied on to set the gripping force in this manner.

Note that Japanese Patent Application Laid-Open No. 2001-246511 discloses a technique for measuring the gripping force generated when a workpiece is gripped by a jig without error and detecting distortion of the workpiece at the measured gripping force.

However, an operation for appropriately setting the gripping force generated when a workpiece is gripped by a jig increases the number of operations to be performed by the operator prior to machining and is therefore burdensome. Moreover, in a typical technique for measuring the gripping force exerted on a workpiece, the gripping force is measured while the workpiece is stationary, but during machining using a lathe that cuts the workpiece by bringing a turning tool into contact with the workpiece while rotating the workpiece, for example, centrifugal force and so on generated as the workpiece rotates acts on the jig, causing the gripping force to decrease, and therefore, although an appropriate gripping force is set while the workpiece is stationary, the workpiece may move while being machined.

SUMMARY OF THE INVENTION

Hence, demand exists for a gripping force adjustment device and a gripping force adjustment system which, during machining of a workpiece, take into account the state of the machining and the state of the workpiece in order to set a more appropriate gripping force.

A gripping force adjustment device according to an aspect of the present invention adjusts a gripping force exerted on a workpiece by a jig for fixing the workpiece in a machine tool that machines the workpiece, and includes a data acquisition unit that acquires at least data indicating a machining state realized by the machine tool and data relating to a gripping state realized on the workpiece by the jig, a pre-processing unit that creates data to be used in machine learning on the basis of the data acquired by the data acquisition unit, and a machine learning device that executes, on the basis of the data created by the pre-processing unit, machine learning processing relating to the gripping force exerted on the workpiece by the jig in the environment in which the machine tool machines the workpiece.

The pre-processing unit may create, as data to be used in supervised learning executed by the machine learning device, state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, machining step data including information relating to machining steps implemented on the workpiece by the machine tool, and gripping force data including information relating to the gripping force exerted on the workpiece by the jig, and label data including at least gripping force suitability data indicating the suitability of the gripping force exerted on the workpiece by the jig. Further, the machine learning device may include a learning unit that generates, on the basis of the state data and the label data, a learning model on which the machining state realized by the machine tool and the gripping state realized on the workpiece by the jig are associated with the suitability of the gripping force exerted on the workpiece by the jig.

The pre-processing unit may create, as data to be used in an estimation executed by the machine learning device, state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, machining step data including information relating to machining steps implemented on the workpiece by the machine tool, and gripping force data including information relating to the gripping force exerted on the workpiece by the jig. Further, the machine learning device may include a learning model storage unit that stores a learning model on which the machining state realized by the machine tool and the gripping state realized on the workpiece by the jig are associated with the suitability of the gripping force exerted on the workpiece by the jig, and an estimation unit that estimates the suitability of the gripping force exerted on the workpiece by the jig on the basis of the state data using the learning model stored in the learning model storage unit. Moreover, the gripping force adjustment device may further include a gripping force determination unit that retrieves the minimum workpiece gripping force that is estimated to be suitable by the estimation unit, and sets the retrieved workpiece gripping force as the gripping force to be exerted on the workpiece by the jig.

The pre-processing unit may create, as data to be used in supervised learning executed by the machine learning device, state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, and machining step data including information relating to machining steps implemented on the workpiece by the machine tool, and label data including at least appropriate gripping force data including information relating to the gripping force exerted on the workpiece by the jig. Further, the machine learning device may include a learning unit that generates, on the basis of the state data and the label data, a learning model on which the machining state realized by the machine tool and the gripping state realized on the workpiece by the jig are associated with the gripping force exerted on the workpiece by the jig.

The pre-processing unit may create, as data to be used in an estimation executed by the machine learning device, state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, and machining step data including information relating to machining steps implemented on the workpiece by the machine tool. Further, the machine learning device may include a learning model storage unit that stores a learning model on which the machining state realized by the machine tool and the gripping state realized on the workpiece by the jig are associated with the gripping force exerted on the workpiece by the jig, and an estimation unit that estimates the gripping force exerted on the workpiece by the jig on the basis of the state data using the learning model stored in the learning model storage unit. Moreover, the gripping force adjustment device may further include a gripping force determination unit that determines the gripping force to be exerted on the workpiece by the jig on the basis of an estimation result acquired by the estimation unit.

The pre-processing unit may create, as data to be used in supervised learning executed by the machine learning device, state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, machining step data including information relating to machining steps implemented on the workpiece by the machine tool, and gripping force data including information relating to the gripping force exerted on the workpiece by the jig, and label data including at least gripping force suitability data indicating the suitability of the gripping force exerted on the workpiece by the jig. Further, the machine learning device may include a learning unit having a first learning unit that generates, on the basis of the state data and the label data, a first learning model on which the machining state realized by the machine tool and the gripping state realized on the workpiece by the jig are associated with the suitability of the gripping force exerted on the workpiece by the jig, and a second learning unit that generates, on the basis of a result of estimation processing using the first learning model generated by the first learning unit, a second learning model on which the machining state realized by the machine tool and the gripping state realized on the workpiece by the jig are associated with the gripping force exerted on the workpiece by the jig.

The pre-processing unit may create, as data to be used in reinforcement learning executed by the machine learning device, state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, machining step data including information relating to machining steps implemented on the workpiece by the machine tool, and gripping force data including information relating to the gripping force exerted on the workpiece by the jig, and determination data including at least fixing force determination data for determining whether or not the workpiece is fixed by the jig and precision determination data for determining whether or not the workpiece has been deformed by the jig. Further, the machine learning device may include a learning unit that generates, on the basis of the state data and the determination data, a learning model on which the machining state realized by the machine tool and the gripping state realized on the workpiece by the jig are associated with an adjustment action to be implemented on the gripping force exerted on the workpiece by the jig, and a decision-making unit that determines an adjustment to be applied to the gripping force exerted on the workpiece by the jig on the basis of the state data using the learning model generated by the learning unit. Moreover, the gripping force adjustment device may further include a gripping force determination unit that determines the gripping force to be exerted on the workpiece by the jig on the basis of the determination made by the decision-making unit.

A gripping force adjustment system according to another aspect of the present invention is a system in which a plurality of devices are connected to each other by a network, the plurality of devices including at least one of the aforementioned gripping force adjustment devices (first gripping force adjustment device according).

The plurality of devices in the system may include a computer provided with a machine learning device, the computer may acquire at least one learning model generated by learning executed by the learning unit of the first gripping force adjustment device, and the machine learning device provided in the computer may execute optimization and streamlining based on the acquired learning model.

The plurality of devices in the system may further include a second gripping force adjustment device that is different from the first gripping force adjustment device, and a learning result acquired by the learning unit provided in the first gripping force adjustment device may be shared with the second gripping force adjustment device.

The plurality of devices in the system may further include a second gripping force adjustment device that is different from the first gripping force adjustment device, and data observed in the second gripping force adjustment device may be used during learning executed by the learning unit provided in the first gripping force adjustment device via the network.

According to an aspect of the present invention, the gripping force exerted on the workpiece by the jig can be adjusted to an appropriate gripping force in consideration of machining conditions such as a spindle rotation speed, a feed rate, and a cutting depth, the material and shape of the workpiece, and so on during machining of the workpiece.

DETAILED DESCRIPTION OF THE PREFERRED EMBODIMENTS

Figure 1:
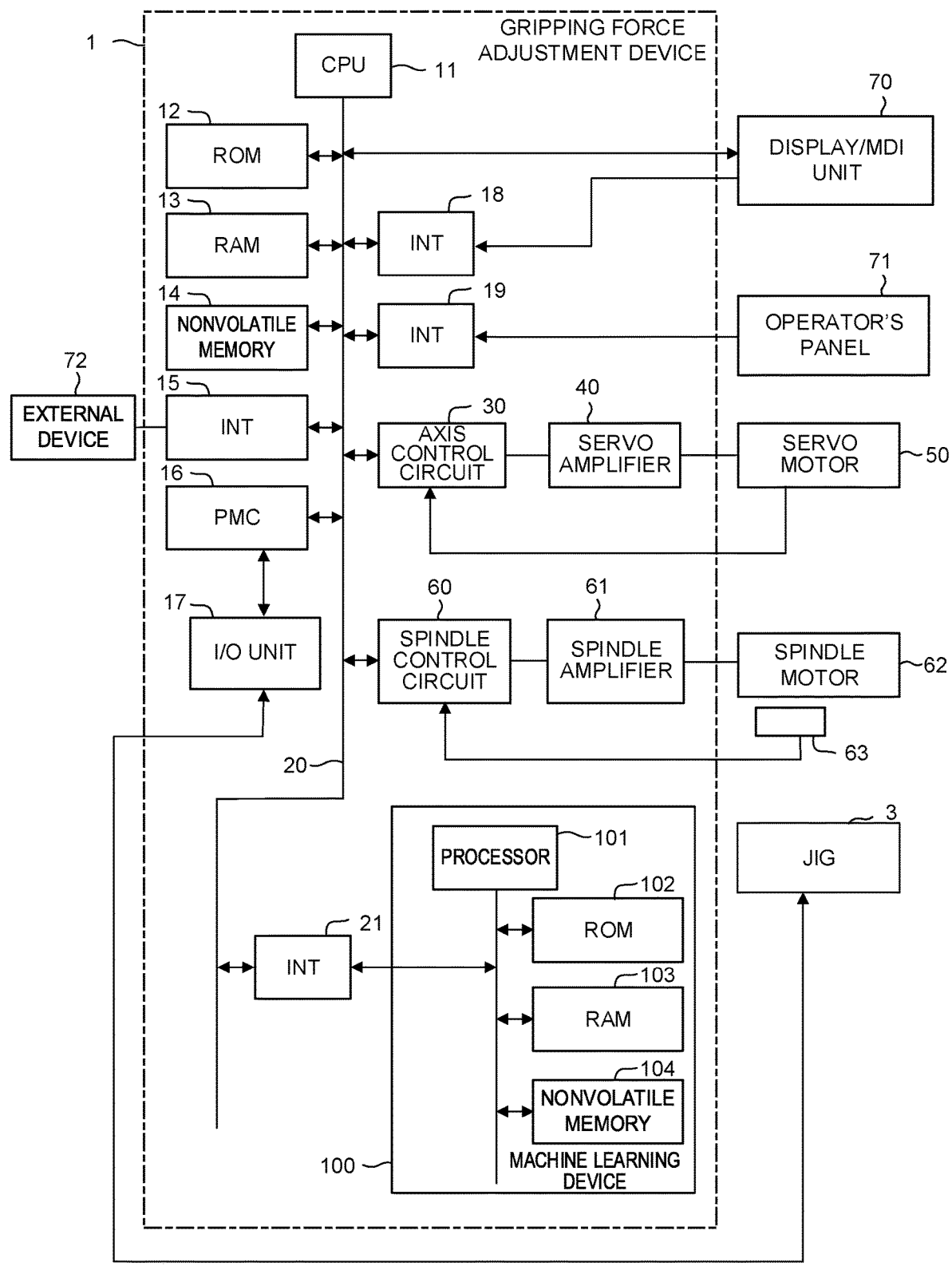
FIG. 1 is a schematic view showing a hardware configuration of a gripping force adjustment device according to an embodiment.

FIG. 1 is a schematic hardware configuration diagram showing main parts of a gripping force adjustment device including a machine learning device, according to an embodiment.

A gripping force adjustment device 1 according to this embodiment can be packaged in a controller for controlling a machine tool, for example. Alternatively, the gripping force adjustment device 1 can be packaged as a personal computer annexed to a controller for controlling a machine tool, a management device connected to the controller over a wired or wireless network, or a computer such as an edge computer, a fog computer, or a cloud server. The gripping force adjustment device 1 according to this embodiment is packaged in a controller for controlling a machine tool.

A CPU 11 provided in the gripping force adjustment device 1 according to this embodiment is a processor for executing overall control of the gripping force adjustment device 1. The CPU 11 reads a system program stored in a ROM 12 via a bus 20 and executes overall control of the gripping force adjustment device 1 in accordance with the system program. Temporary calculation data and display data, various data input by an operator using an input unit, not shown in the figure, and so on are stored temporarily in a RAM 13.

A nonvolatile memory 14 is formed, for example, from a memory that is backed up by a battery, not shown in the figure, or the like so that the storage state thereof is maintained even after a power supply of the gripping force adjustment device 1 is switched OFF. A program read from an external device 72 via an interface 15, a program input via a display/MDI unit 70, and various data acquired from respective parts of the gripping force adjustment device 1, the machine tool, a jig 3, and so on (for example, information relating to the tool, such as the tool type, information relating to cutting conditions such as a spindle rotation speed, a feed rate, and a cutting depth, voltage values or the current values of motors for driving respective axes, information relating to machining steps such as rough machining and finishing machining, information relating to the workpiece, such as the material and shape of the workpiece, information relating to the jig, such as the jig type and the gripping force of the jig, and so on) are stored in the nonvolatile memory 14. The programs and various data stored in the nonvolatile memory 14 may be expanded in the RAM 13 during execution/use. Further, various system programs (including a system program for controlling communication with a machine learning device 100, to be described below), such as a well-known analysis program, are written to the ROM 12 in advance.

The interface 15 is an interface for connecting the gripping force adjustment device 1 to the external device 72, such as an adaptor. Programs, various parameters, and so on are read from the external device 72 side. Further, programs, various data, and so on edited in the gripping force adjustment device 1 can be stored in external storage means via the external device 72. A programmable machine controller (PMC) 16 implements and controls signal input and output to and from the machine tool and peripheral devices of the machine tool, such as the jig 3, via an I/O unit 17 in accordance with a sequence program built into the gripping force adjustment device 1.

The jig 3 is a device such as a vice or a chuck for gripping and fixing the workpiece machined by the machine tool. The gripping force adjustment device 1 adjusts the gripping force exerted on the workpiece by the jig 3 via a signal output from the PMC 16. Further, the jig 3 transmits information such as the gripping force exerted on the workpiece by the jig 3 to the CPU 11 via the PMC 16.

The display/MDI unit 70 is a manual data input device including a display, a keyboard, and so on. An interface 18 receives commands and data from the keyboard of the display/MDI unit 70 and transmits the received commands and data to the CPU 11. The interface 19 is connected to an operator's panel 71 including a manual pulse generator and so on used when the respective axes are driven manually.

An axis control circuit 30 for controlling the respective axes of the machine tool receives an axis movement command amount from the CPU 11 and outputs an axis command to a servo amplifier 40. The servo amplifier 40 receives the command and drives a servomotor 50 for moving an axis provided on the machine tool. The servo motor 50 of the axis has a built-in position/speed detector and implements position/speed feedback control by feeding back a position/speed feedback signal from the position/speed detector to the axis control circuit 30. Note that on the hardware configuration diagram of FIG. 1, the axis control circuit 30, the servo amplifier 40, and the servo motor 50 are each shown singly but in reality are provided in a number corresponding to the number of axes provided in the machine tool serving as the control subject (for example, three of each for a machine tool having three linear axes, or five of each for a five-axis machine tool).

A spindle control circuit 60 receives a spindle rotation command for a spindle of the machine tool and outputs a spindle speed signal to a spindle amplifier 61. The spindle amplifier 61 receives the spindle speed signal and drives the tool by rotating a spindle motor 62 of the spindle at the rotation speed given as the command. A position detector 63 is joined to the spindle motor 62, and the position detector 63 outputs a feedback pulse in synchronization with the rotation of the spindle. The feedback pulse is read by the CPU 11.

An interface 21 is an interface for connecting the gripping force adjustment device 1 to the machine learning device 100. The machine learning device 100 includes a processor 101 for executing overall control of the machine learning device 100, a ROM 102 storing a system program and so on, a RAM 103 for performing temporary storage during machining relating to machine learning, and a nonvolatile memory 104 used to store a learning model and so on. The machine learning device 100 is capable of observing the information that can be acquired by the gripping force adjustment device 1 via the interface 21 (for example, information relating to the tool, such as the tool type, information relating to the cutting conditions, such as the spindle rotation speed, the feed rate, and the cutting depth, the voltage values or current values of the motors for driving the respective axes, information relating to machining steps such as rough during machining and finishing during machining, information relating to the workpiece, such as the material and shape of the workpiece, information relating to the jig, such as the jig type and the gripping force of the jig, and so on). Further, the gripping force adjustment device 1, upon reception of information output from the machine learning device 100, controls the machine tool and the jig 3, displays information on the display/MDI unit 70, transmits information to another device (not shown) over a network, and so on.

Figure 2:
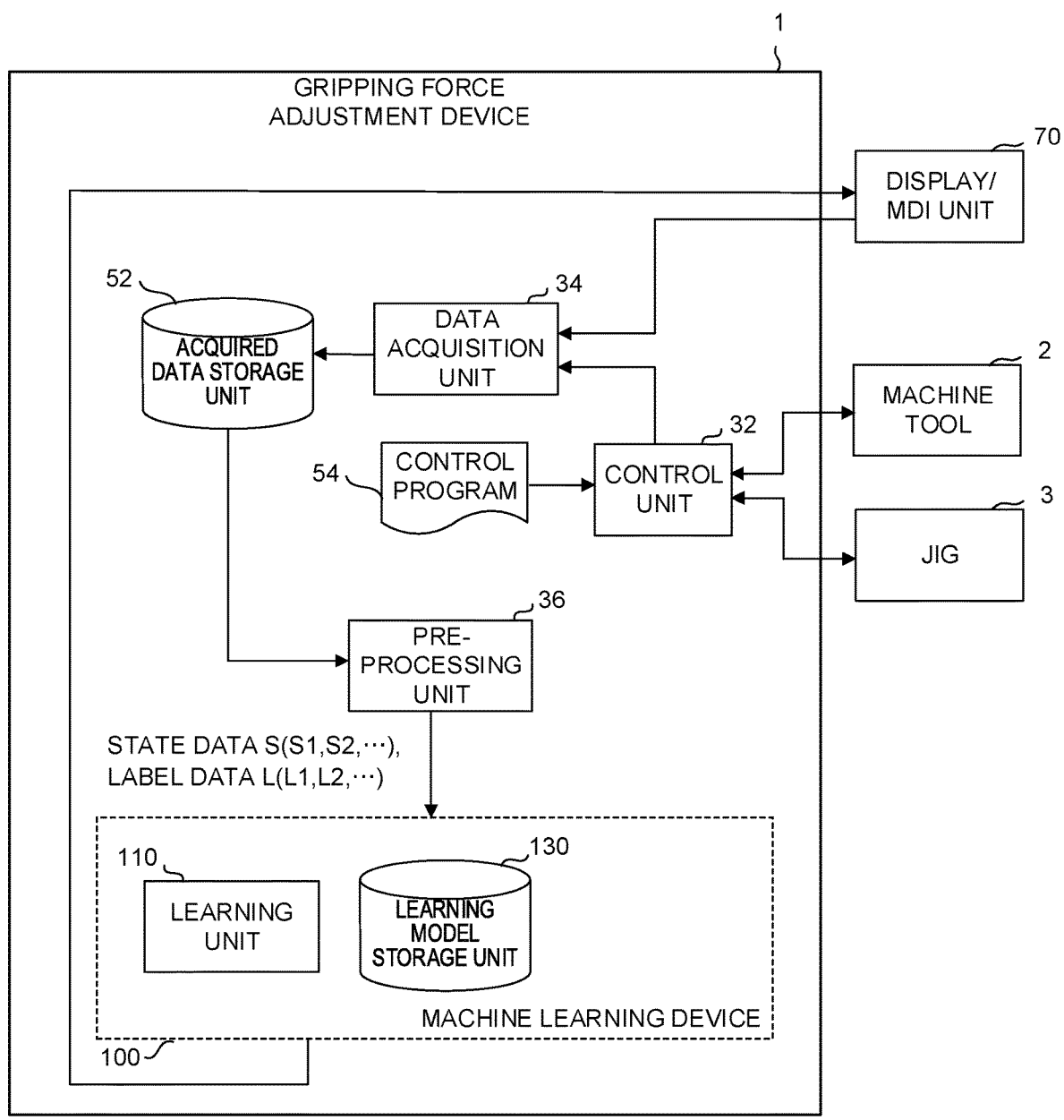
FIG. 2 is a schematic function block diagram of a controller according to a first embodiment (and a third embodiment)

FIG. 2 is a schematic function block diagram of the gripping force adjustment device 1 and the machine learning device 100 according to a first embodiment.

The gripping force adjustment device 1 according to this embodiment includes a configuration (a learning mode) required for the machine learning device 100 to perform supervised learning. The function blocks shown in FIG. 2 are implemented by having the CPU 11 of the gripping force adjustment device 1 and the processor 101 of the machine learning device 100, shown in FIG. 1, execute the respective system programs thereof so as to control the operations of the respective parts of the gripping force adjustment device 1 and the machine learning device 100.

The gripping force adjustment device 1 according to this embodiment includes a control unit 32, a data acquisition unit 34, and a pre-processing unit 36. The machine learning device 100 provided in the gripping force adjustment device 1 includes a learning unit 110. Further, an acquired data storage unit 52 for storing data acquired from a machine tool 2, the jig 3, and so on is provided in the nonvolatile memory 14 shown in FIG. 1, and a learning model storage unit 130 for storing a learning model constructed by the learning unit 110 through machine learning is provided in the nonvolatile memory 104 of the machine learning device 100 shown in FIG. 1.

The control unit 32 is implemented by having the CPU 11 provided in the gripping force adjustment device 1 shown in FIG. 1 execute the system program read from the ROM 12 so that mainly, the CPU 11 executes calculation processing using the RAM 13 and the nonvolatile memory 14 and executes control processing on the machine tool 2 and the jig 3 via the axis control circuit 30, the spindle control circuit 60, and the PMC 16. The control unit 32 controls the operations of the machine tool 2 and the jig 3 on the basis of a control program 54 stored in the nonvolatile memory 14 shown in FIG. 1. The control unit 32 has a function for executing general control required to control the respective parts of the machine tool 2, this general control including outputting movement commands at control period intervals to the servo motor 50 (FIG. 1) and the spindle motor (FIG. 1) for driving each axis of the machine tool 2, in accordance with the control program 54. Further, the control unit 32 outputs a command to the jig 3 to adjust the gripping force exerted on the workpiece. Furthermore, the control unit 32 receives, from the machine tool 2 and the jig 3, information relating to a machining state realized by the machine tool 2 and a gripping state realized on the workpiece by the jig 3, and outputs the received information to the data acquisition unit 34. The data acquired by the control unit 32 from the machine tool 2 and the jig 3 and output to the data acquisition unit 34 include, for example, information relating to the tool, such as the tool type, information relating to the cutting conditions, such as the spindle rotation speed, the feed rate, and the cutting depth, information relating to the voltage values or current values of the motors for driving the respective axes, information relating to machining steps such as rough machining and finishing machining, information relating to the workpiece, such as the material and shape of the workpiece, information relating to the jig, such as the jig type and the gripping force of the jig, and so on.

The data acquisition unit 34 is implemented by having the CPU 11 provided in the gripping force adjustment device 1 shown in FIG. 1 execute the system program read from the ROM 12 so that mainly, the CPU 11 executes calculation processing using the RAM 13 and the nonvolatile memory 14. The data acquisition unit 34 stores data relating to the machining state realized by the machine tool 2 and data relating to the gripping state realized on the workpiece by the jig 3, these data being input from the control unit 32, data relating to an evaluation of the gripping force exerted on the jig 3, input by an operator from the display/MDI unit 70, and so on in the acquired data storage unit 52. The data acquisition unit 34 associates the data relating to the machining state realized by the machine tool 2 and the data relating to the gripping state realized on the workpiece by the jig 3, input from the control unit 32, with the data relating to the evaluation of the gripping force exerted on the workpiece by the jig 3 and stores the associated data in the acquired data storage unit 52 as acquired data.

The pre-processing unit 36 is implemented by having the CPU 11 provided in the gripping force adjustment device 1 shown in FIG. 1 execute the system program read from the ROM 12 so that mainly, the CPU 11 executes calculation processing using the RAM 13 and the nonvolatile memory 14. The pre-processing unit 36 creates the learning data to be used in machine learning by the machine learning device 100 on the basis of the data acquired by the data acquisition unit 34. The pre-processing unit 36 creates learning data by converting (digitizing, sampling, or the like) the data acquired by the data acquisition unit 34 (and stored in the acquired data storage unit 52) into a unified format handled by the machine learning device 100. For example, when the machine learning device 100 performs supervised learning, the pre-processing unit 36 creates a set of state data S and label data L in the predetermined format of the learning as the learning data.

The state data S created by the pre-processing unit 36 according to this embodiment include at least tool data S1 including information relating to a tool used in the machining executed on the workpiece by the machine tool 2, machining condition data S2 including information relating to the machining conditions of the machining performed on the workpiece by the machine tool 2, workpiece data S3 including information relating to the workpiece machined by the machine tool 2, jig data S4 including information relating to the type of the jig 3, machining step data S5 including information relating to the machining steps implemented on the workpiece by the machine tool 2, and gripping force data S6 including the gripping force applied by the jig 3.

The tool data S1 are defined as a data string indicating the type and material of the tool used in the machining executed by the machine tool 2 on the workpiece. The tool type may be classified according to the shape of the tool and the use method thereof during the machining, for example as a vice, a milling tool, a drill, or the like, and each classification may be represented by a univocally identifiable numerical value. Further, as regards the material of the tool, tool materials such as vice steel and cemented carbide, for example, may each be represented by a univocally identifiable numerical value. Tool-related information set by the operator in relation to the gripping force adjustment device 1 and the machine tool 2 may be acquired, and the tool data S1 may be created on the basis of the acquired tool-related information.

The machining condition data S2 are defined as a data string having as elements the machining conditions set and/or given as commands during the machining performed on the workpiece by the machine tool 2, such as the spindle rotation speed, the feed rate, and the cutting depth. Numerical values expressing values of the respective machining conditions in predetermined units may be used as the spindle rotation speed, the feed rate, and the cutting depth. The values of the respective machining conditions are either given as commands by the control program 54 or set at default control values, and therefore the machining condition data S2 may be created by acquiring these values.

The workpiece data S3 are defined as a data string indicating the material of the workpiece to be machined by the machine tool 2 and the shape of the workpiece being machined. As regards the material of the workpiece, workpiece materials such as aluminum, iron, and so on, for example, may be represented by univocally identifiable numerical values. As regards the shape of the workpiece being machined, the average depth/width/height of the workpiece may be expressed as a data string, or the shape of the workpiece may be expressed more precisely as a data string that represents the shape of the workpiece on the basis of CAD data or the like. The workpiece data S3 may be created on the basis of data related to the workpiece set by the operator on the gripping force adjustment device 1 or the machine tool 2, data acquired by the shape of the workpiece measured before start of machining, data acquired from a CAD/CAM device, or data relating to the machining path, which are acquired by analyzing the control program 54, and so on.

The jig data S4 are defined as a data string indicating the type of the jig 3 used to grip the workpiece. As regards the type of the jig, the jig type may be classified according to the structure by which the jig grips the workpiece, for example as a vice, a chuck, and so on, and each type may be represented by a univocally identifiable numerical value. The jig data S4 may be created on the basis of information relating to the jig 3, which is set by the operator on the gripping force adjustment device 1 or the machine tool 2, structural information relating to the jig 3, which is acquired from the jig 3, and so on.

The machining step data S5 are defined as data indicating the step of the machining performed on the workpiece by the machine tool 2. As regards the step of the machining, machining steps such as rough machining, intermediate finishing machining, and finishing machining, for example, may each be represented by a univocally identifiable numerical value. The machining step data S5 may be created on the basis of data acquired from a CAD/CAM device prior to the start of the machining, machining step-related data acquired by analyzing the control program 54, and so on.

The gripping force data S6 are defined as data indicating the gripping force exerted on the workpiece by the jig 3. The gripping force exerted on the workpiece by the jig 3 may be obtained by expressing the gripping force acquired from the jig 3 as a numerical value in predetermined units or may, for example, be expressed by a numerical value indicating the gripping force acquired from the jig 3 in a plurality of stages (10 stages, for example). The gripping force data S6 may be obtained by acquiring a value detected by a torque sensor (not shown) attached to the jig 3 or may be determined indirectly from the current value/voltage value of the motor that drives the jig 3 and so on.

The label data L created by the pre-processing unit 36 include at least gripping force suitability data L1, which are data relating to an evaluation indicating whether or not the gripping force exerted on the workpiece by the jig 3 is sufficient in the machining state in which the state data S described above are acquired.

The gripping force suitability data L1 are defined as data taking a label value relating to an evaluation indicating whether or not the gripping force exerted on the workpiece by the jig 3 is sufficient. The gripping force suitability data L1 may be created on the basis of an input operation performed by the operator using the display/MDI unit 70 while observing the machining condition of the workpiece machined by the machine tool 2, for example. In this case, the operator may input information indicating that the gripping force exerted on the workpiece by the jig 3 is insufficient after noticing the workpiece move during machining of the workpiece, or the operator may adjust the gripping force applied by the jig 3, and when an identical machining state remains established continuously for a predetermined time in this state, create gripping force suitability data L1 indicating that the adjusted gripping force exerted on the workpiece by the jig 3 is sufficient. Alternatively, the machining precision of the workpiece may be measured using a distance sensor or the like either when machining by the machine tool 2 is complete or when a predetermined break in the machining is reached, for example, and the gripping force suitability data L1 may be created on the basis of the measurement result. For example, gripping force suitability data L1 indicating that the gripping force with respect to state data S acquired during machining in which the machining precision was poor may be created.

The learning unit 110 is implemented by having the processor 101 provided in the gripping force adjustment device 1 shown in FIG. 1 execute the system program read from the ROM 102 so that mainly, the processor 101 executes calculation processing using the RAM 103 and the nonvolatile memory 104. The learning unit 110 according to this embodiment performs machine learning using the learning data created by the pre-processing unit 36. The learning unit 110 uses a well-known supervised learning method to generate a learning model on which an evaluation of the gripping force exerted on the workpiece by the jig 3 is learned in relation to the machining state realized by the machine tool 2 and the gripping state realized on the workpiece by the jig 3, and stores the generated learning model in the learning model storage unit 130. A multilayer perceptron method, a recurrent neural network method, a long short-term memory method, a convolutional neural network method, and so on may be cited as examples of the supervised learning method implemented by the learning unit 110.

The learning unit 110 according to this embodiment generates a learning model on which an evaluation of the gripping force exerted on the workpiece by the jig 3 and the machining state realized by the machine tool 2 and the gripping state realized on the workpiece by the jig 3 are learned in association with each other. The learning unit 110 generates the learning model using the learning data (a set of the state data S and the gripping force suitability data L1) input from the pre-processing unit 36. The learning model generated in this manner by the learning unit 110 according to this embodiment is used to estimate whether or not the gripping force exerted on the workpiece by the jig 3 is sufficient in a given state of the machining state realized by the machine tool 2 and the gripping state realized on the workpiece by the jig 3.

Note that although the learning unit 110 is an essential configuration at the learning stage, the learning unit 110 is not necessarily an essential configuration once the learning unit 110 has finished learning the evaluation of the gripping force exerted on the workpiece by the jig 3. In a case where the machine learning device 100 is shipped to a customer after learning is completed or the like, for example, the machine learning device 100 may be shipped after removing the learning unit 110.

The gripping force adjustment device 1 according to this embodiment, configured as described above, generates a learning model on which an evaluation of the gripping force exerted on the workpiece by the jig 3 and the machining state realized by the machine tool 2 and the gripping state realized on the workpiece by the jig 3 are learned in association with each other. Then, using the learning model generated in this manner, an estimation unit 120 to be described below can perform required estimation processing on the basis of the state data S acquired from the machine tool 2 and the jig 3 in order to determine a more appropriate gripping force for the acquired state.

In a modified example of the gripping force adjustment device 1 according to this embodiment, the pre-processing unit 36 may create cutting resistance data S7 indicating a cutting resistance exerted on the tool (and/or the workpiece) during machining of the workpiece by the machine tool 2 as the state data S in addition to the tool data S1, machining condition data S2, workpiece data S3, jig data S4, machining step data S5, and gripping force data S6. The cutting resistance data S7 can be defined as a data string indicating the force exerted on each of the axes that move the tool and the workpiece relative to each other during machining of the workpiece by the machine tool 2, for example. The force exerted on each of the axes that move the tool and the workpiece relative to each other may be acquired from a torque sensor attached to each axis, for example, or may be determined indirectly from the voltage values or current values of the motors that drive the respective axes and so on.

By adding the cutting resistance data S7 to the learning processing and estimation processing executed by the machine learning device 100, the required gripping force to be exerted on the workpiece by the jig 3 during machining of the workpiece can be learned more precisely and used to estimate the required gripping force to be exerted on the workpiece by the jig 3 during machining of the workpiece.

In another modified example of the gripping force adjustment device 1 according to this embodiment, the pre-processing unit 36 may also create spindle position data S8 indicating the position of the spindle of the machine tool 2 as the state data. During machining of the workpiece by the machine tool 2, the effect of the cutting resistance on the jig 3 varies depending on whether the workpiece is being machined in a position near the jig 3 or a position far from the jig 3. Therefore, by adding the spindle position data S8 to the data used during learning, information relating to the gripping force to be exerted on the workpiece by the jig 3 can be learned in relation to the contact position between the tool and the workpiece, and this information can be used to estimate the required gripping force to be exerted on the workpiece by the jig 3 during machining of the workpiece.

Figure 3:
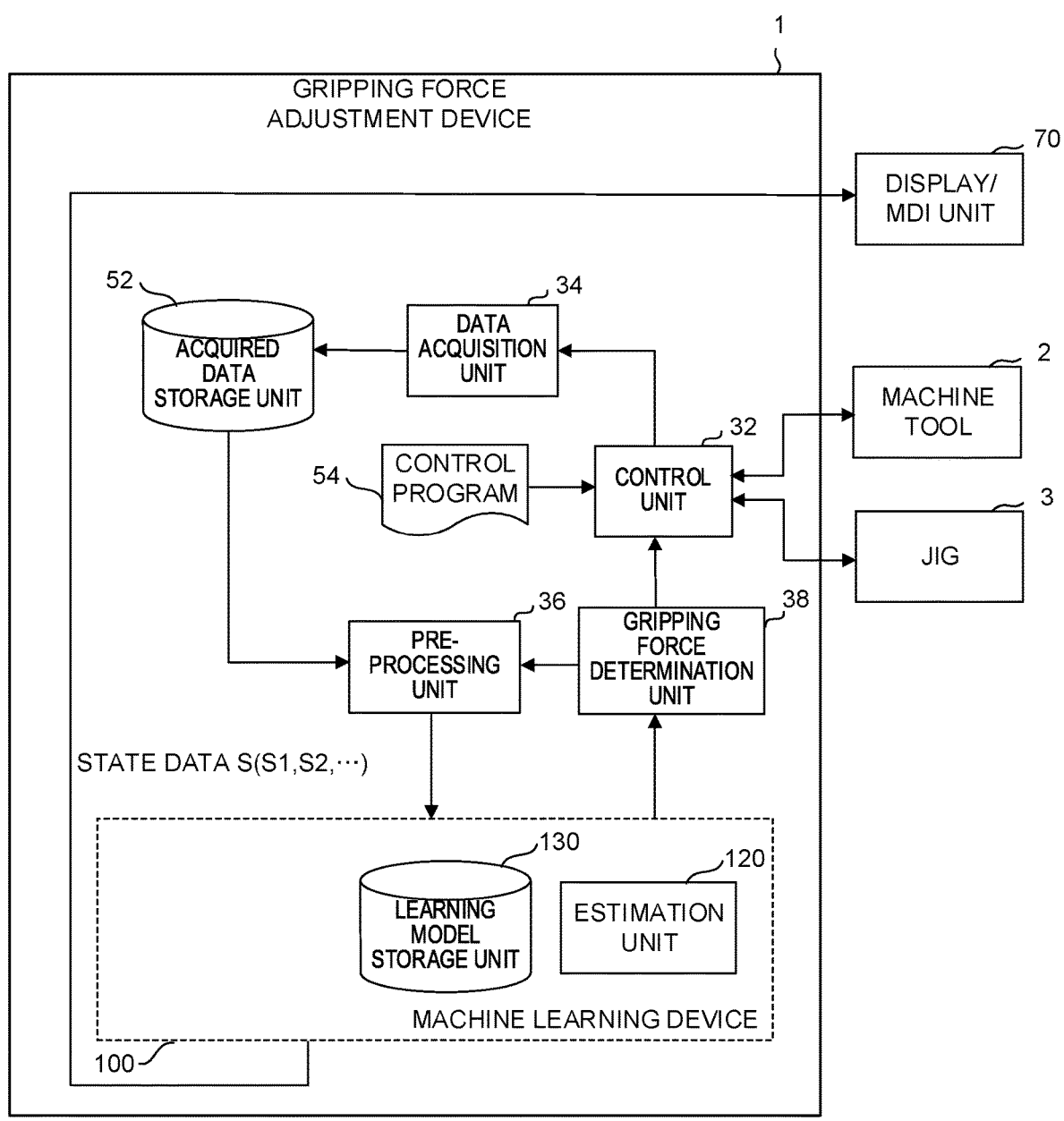
FIG. 3 is a schematic function block diagram of a gripping force adjustment device according to a second embodiment.

FIG. 3 is a schematic functional block diagram of the gripping force adjustment device 1 and the machine learning device 100 according to a second embodiment.

The gripping force adjustment device 1 according to this embodiment includes a configuration (an estimation mode) required for the machine learning device 100 to estimate evaluations of respective gripping forces exerted on the workpiece by the jig 3. The function blocks shown in FIG. 3 are respectively implemented by having the CPU 11 of the gripping force adjustment device 1 and the processor 101 of the machine learning device 100, shown in FIG. 1, execute the respective system programs thereof so as to control the operations of the respective parts of the gripping force adjustment device 1 and the machine learning device 100.

The gripping force adjustment device 1 according to this embodiment includes the control unit 32, the data acquisition unit 34, the pre-processing unit 36, and a gripping force determination unit 38. The machine learning device 100 provided in the gripping force adjustment device 1 includes the estimation unit 120. Further, the acquired data storage unit 52 for storing the data acquired from the machine tool 2, the jig 3, and so on is provided in the nonvolatile memory 14 shown in FIG. 1, and the learning model storage unit 130 for storing the learning model constructed in the machine learning executed by the learning unit 110, as described in the first embodiment, is provided in the nonvolatile memory 104 of the machine learning device 100 shown in FIG. 1.

The control unit 32 and the data acquisition unit 34 according to this embodiment have similar functions to the control unit 32 and the data acquisition unit 34 of the first embodiment (FIG. 2).

The pre-processing unit 36 according to this embodiment creates the state data S in a predetermined format used during estimation by the machine learning device 100 by converting (digitizing, sampling, or the like) the data acquired by the data acquisition unit 34 into a unified format handled by the machine learning device 100 at the stage of estimating evaluations of the respective gripping forces exerted on the workpiece by the jig 3 using the learning model generated by the machine learning device 100. When creating the state data S, the pre-processing unit 36 according to this embodiment creates gripping force data S6 indicating a provisional gripping force issued as a command by the gripping force determination unit 38 to the jig 3. For example, the pre-processing unit 36 creates the tool data S1, the machining condition data S2, the workpiece data S3, the jig data S4, and the machining step data S5 on the basis of the data acquired by the data acquisition unit 34, and creates gripping force data S6 indicating a provisional gripping force issued to the jig 3 as a command on the basis of a command from the gripping force determination unit 38. At the start of estimation, the pre-processing unit 36 may create gripping force data S6 indicating a preset gripping force.

The estimation unit 120 is implemented by having the processor 101 provided in the gripping force adjustment device 1 shown in FIG. 1 execute the system program read from the ROM 102 so that mainly, the processor 101 executes calculation processing using the RAM 103 and the nonvolatile memory 104. The estimation unit 120 estimates evaluations of the respective gripping forces exerted on the workpiece by the jig 3 using the learning model stored in the learning model storage unit 130 on the basis of the state data S created by the pre-processing unit 36. The estimation unit 120 of this embodiment estimates and outputs evaluations of the respective gripping forces exerted on the workpiece by the jig 3 by inputting the state data S input therein from the pre-processing unit 36 into the learning model generated by (having parameters determined by) the learning unit 110. An estimation result acquired by the estimation unit 120 is output to the gripping force determination unit 38.

The gripping force determination unit 38 is implemented by having the CPU 11 provided in the gripping force adjustment device 1 shown in FIG. 1 execute the system program read from the ROM 12 so that mainly, the CPU 11 executes calculation processing using the RAM 13 and the nonvolatile memory 14. The gripping force determination unit 38 determines the gripping force to be exerted on the workpiece by the jig 3 on the basis of the estimation result of the evaluations of the respective gripping forces exerted on the workpiece by the jig 3, estimated by the estimation unit 120. The gripping force determination unit 38 refers to the gripping force evaluation estimation result output by the estimation unit 120, and when the estimation result indicates that "the gripping force is sufficient", the gripping force determination unit 38 issues a command to the pre-processing unit 36 to create state data S in which the gripping force exerted on the jig 3 is reduced by one stage. Further, the gripping force determination unit 38 refers to the gripping force evaluation estimation result output by the estimation unit 120, and when the estimation result indicates that "the gripping force is insufficient", the gripping force determination unit 38 issues a command to the pre-processing unit 36 to create state data S in which the gripping force exerted on the jig 3 is increased by one stage. By repeating this processing, the gripping force determination unit 38 retrieves the minimum gripping force at which an estimation result indicating that "the gripping force is sufficient" is acquired, and sets the retrieved gripping force as the gripping force to be exerted on the workpiece by the jig 3.

Using FIG. 4, a flow by which the gripping force determination unit 38 determines the gripping force to be exerted on the workpiece by the jig 3 will be described.

Figure 4:
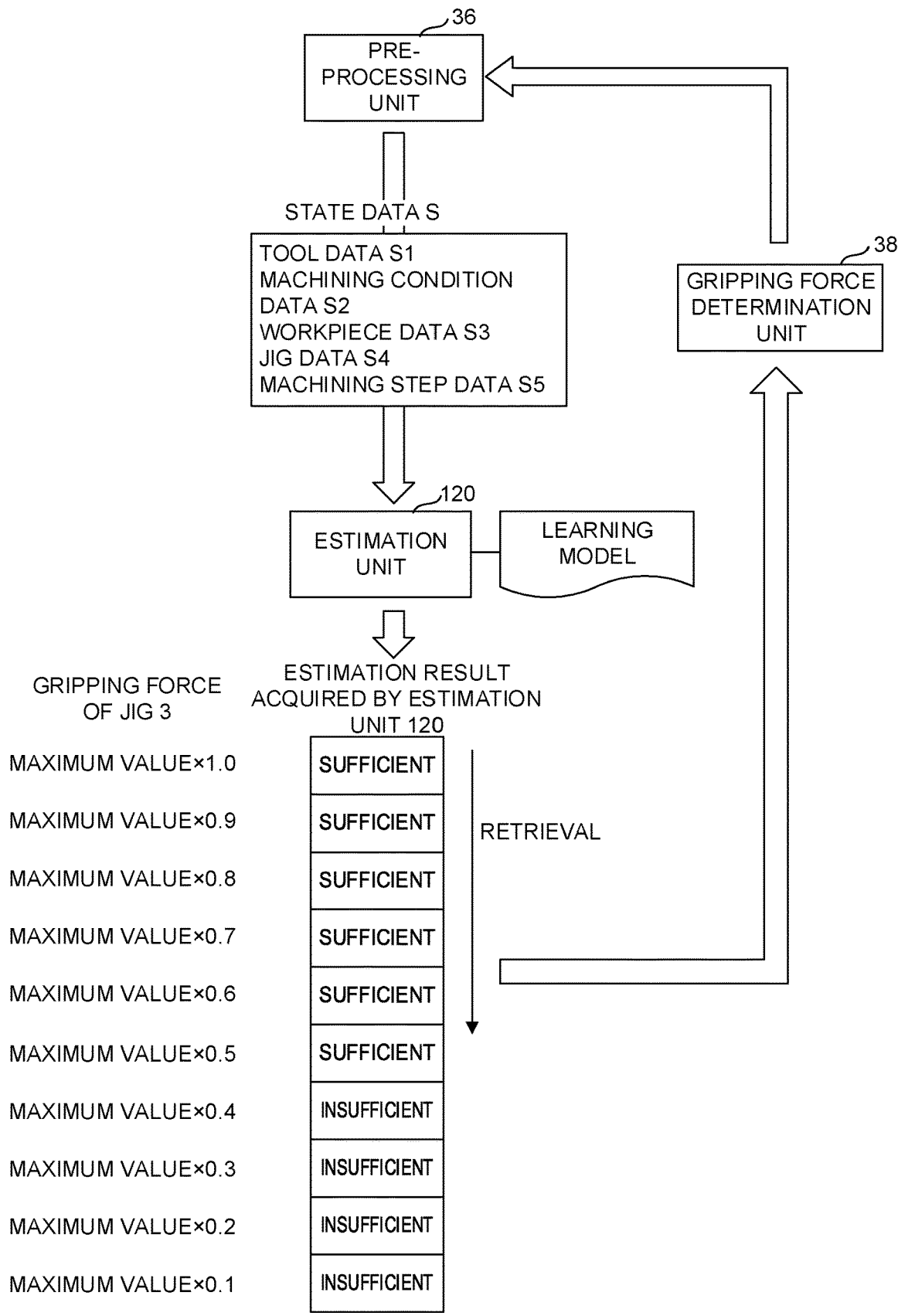
FIG. 4 is a view illustrating an operation of a gripping force determination unit.

In the example of FIG. 4, the gripping force exerted on the workpiece by the jig 3 can be adjusted in 10 stages. When determining the gripping force to be exerted on the workpiece by the jig 3, first, the pre-processing unit 36 creates state data S including gripping force data S6 indicating a preset gripping force (for example, the maximum value× 1.0). The estimation unit 120 then estimates the evaluation of this gripping force exerted on the workpiece on the basis of the state data S created by the pre-processing unit 36. Here, when the estimation unit 120 outputs an estimation result indicating that "the gripping force is sufficient", the gripping force determination unit 38 issues a command to the pre-processing unit 36 to create state data S in which the gripping force has been reduced by one stage. On the basis of the command from the gripping force determination unit 38, the pre-processing unit 36 creates state data S in which the gripping force has been reduced by one stage, whereupon the estimation unit 120 estimates an evaluation of the gripping force on the basis of the created state data S. When, as a result of repeating this process, the evaluation from the estimation unit 120 switches from "the gripping force is sufficient" to "the gripping force is insufficient", the gripping force determination unit 38 determines that the gripping force exerted on the workpiece at the stage where the command is issued to the pre-processing unit 36 immediately before that switching time is the appropriate gripping force to be exerted on the workpiece (the minimum gripping force exerted on the workpiece at which the evaluation indicates that "the gripping force is sufficient") and sets this gripping force as the gripping force to be exerted on the workpiece by the jig 3.

Retrieval of the gripping force exerted on the workpiece by the gripping force determination unit 38 may be started from the maximum gripping force, as described above, or retrieval may be performed upward from the minimum value of the gripping force or performed both upward and downward from an intermediate value of the gripping force. Alternatively, the minimum value of the gripping force may be retrieved using a well-known algorithm such as a binary search.

Having determined the gripping force to be exerted on the workpiece by the jig 3, the gripping force determination unit 38 issues a command to the control unit 32 to adjust the gripping force to the determined gripping force.

The gripping force adjustment device 1 according to this embodiment, configured as described above, is capable of adjusting the gripping force exerted on the workpiece by the jig 3 to the minimum force at which the workpiece can be sufficiently fixed.

In a modified example of the gripping force adjustment device 1 according to this embodiment, the pre-processing unit 36 may create the cutting resistance data S7 indicating the cutting resistance exerted on the tool (and/or the workpiece) during machining of the workpiece by the machine tool 2 as the state data S in addition to the tool data S1, machining condition data S2, workpiece data S3, jig data S4, machining step data S5, and gripping force data S6. The cutting resistance data S7 can be defined as a data string indicating the force exerted on each of the axes that move the tool and the workpiece relative to each other during machining of the workpiece by the machine tool 2, for example. The force exerted on each of the axes that move the tool and the workpiece relative to each other may be acquired from a torque sensor attached to each axis, for example, or may be determined indirectly from the voltage values or current values of the motors that drive the respective axes and so on. By adding the cutting resistance data S7 to the learning processing and estimation processing executed by the machine learning device 100, the required gripping force to be exerted on the workpiece by the jig 3 during machining of the workpiece can be estimated more precisely.

In another modified example of the gripping force adjustment device 1 according to this embodiment, the pre-processing unit 36 may also create the spindle position data S8 indicating the position of the spindle of the machine tool 2 as the state data S. During machining of the workpiece by the machine tool 2, the effect of the cutting resistance on the jig 3 varies depending on whether the workpiece is being machined in a position near the jig 3 or a position far from the jig 3. Therefore, by adding the spindle position data S8 to the data used during learning, the required gripping force to be exerted on the workpiece by the jig 3 during machining of the workpiece can be estimated more precisely.

The gripping force adjustment device 1 according to a third embodiment of the present invention will be described below. The gripping force adjustment device 1 according to this embodiment has identical function blocks to the first embodiment shown in FIG. 2. The gripping force adjustment device 1 according to this embodiment includes a configuration (a learning mode) required for the machine learning device 100 to perform supervised learning.

The control unit 32 and the data acquisition unit 34 according to this embodiment have similar functions to the control unit 32 and the data acquisition unit 34 of the first embodiment.

The pre-processing unit 36 according to this embodiment creates the tool data S1, the machining condition data S2, the workpiece data S3, the jig data S4, and the machining step data S5 as the state data S, and also creates appropriate gripping force data L2 as the label data L, which are data relating to the appropriate gripping force to be exerted on the workpiece by the jig 3 in the machining state in which the state data S were acquired.

The appropriate gripping force data L2 are defined as data in which the appropriate gripping force to be exerted on the workpiece in the current states of the machine tool 2 and the jig 3 is acquired as a label value. The appropriate gripping force data L2 may be created on the basis of an input operation performed using the display/MDI unit 70 by an experienced operator who is machining the workpiece using the machine tool 2, for example. In this case, for example, the operator may adjust the gripping force exerted on the workpiece by the jig 3, and when an identical machining state remains established continuously for a predetermined time in this state, the operator may create the appropriate gripping force data L2 using the gripping force exerted on the workpiece at that time.

The learning unit 110 according to this embodiment performs machine learning using the learning data created by the pre-processing unit 36. The learning unit 110 uses a well-known supervised learning method to generate a learning model on which the gripping force exerted on the workpiece by the jig 3 is learned in relation to the machining state realized by the machine tool 2 and the gripping state realized on the workpiece by the jig 3, and stores the generated learning model in the learning model storage unit 130. A multilayer perceptron method, a recurrent neural network method, a long short-term memory method, a convolutional neural network method, and so on may be available as examples of the supervised learning method executed by the learning unit 110.

The learning unit 110 according to this embodiment generates a learning model on which the gripping force exerted on the workpiece by the jig 3 is learned in association with the machining state realized by the machine tool 2 and the gripping state realized on the workpiece by the jig 3. The learning model generated in this manner by the learning unit 110 according to this embodiment is used to estimate the appropriate gripping force to be exerted on the workpiece by the jig 3 in a given state of the machining state realized by the machine tool 2 and the gripping state realized on the workpiece by the jig 3.

Note that although the learning unit 110 is an essential configuration at the learning stage, the learning unit 110 is not necessarily an essential configuration once the learning unit 110 has finished learning the evaluation of the gripping force exerted on the workpiece by the jig 3. In a case where the machine learning device 100 is shipped to a customer after learning is completed or the like, for example, the machine learning device 100 may be shipped after removing the learning unit 110.

The gripping force adjustment device 1 according to this embodiment, configured as described above, generates a learning model on which the gripping force exerted on the workpiece by the jig 3 and the machining state realized by the machine tool 2 and the gripping state realized on the workpiece by the jig 3 are learned in association with each other. Since the gripping force adjustment device 1 according to this embodiment is required to execute learning on the basis of the appropriate gripping force to be exerted on the workpiece by the jig 3, set by the operator, it is difficult to collect sufficient learning data for learning. On the other hand, once sufficient machine learning is completed, the estimation unit 120, to be described below, can use the learning model generated in this manner to directly estimate, on the basis of the state data S acquired from the machine tool 2 and the jig 3, the appropriate gripping force to be exerted on the workpiece by the jig 3 in the acquired state.

Figure 5:
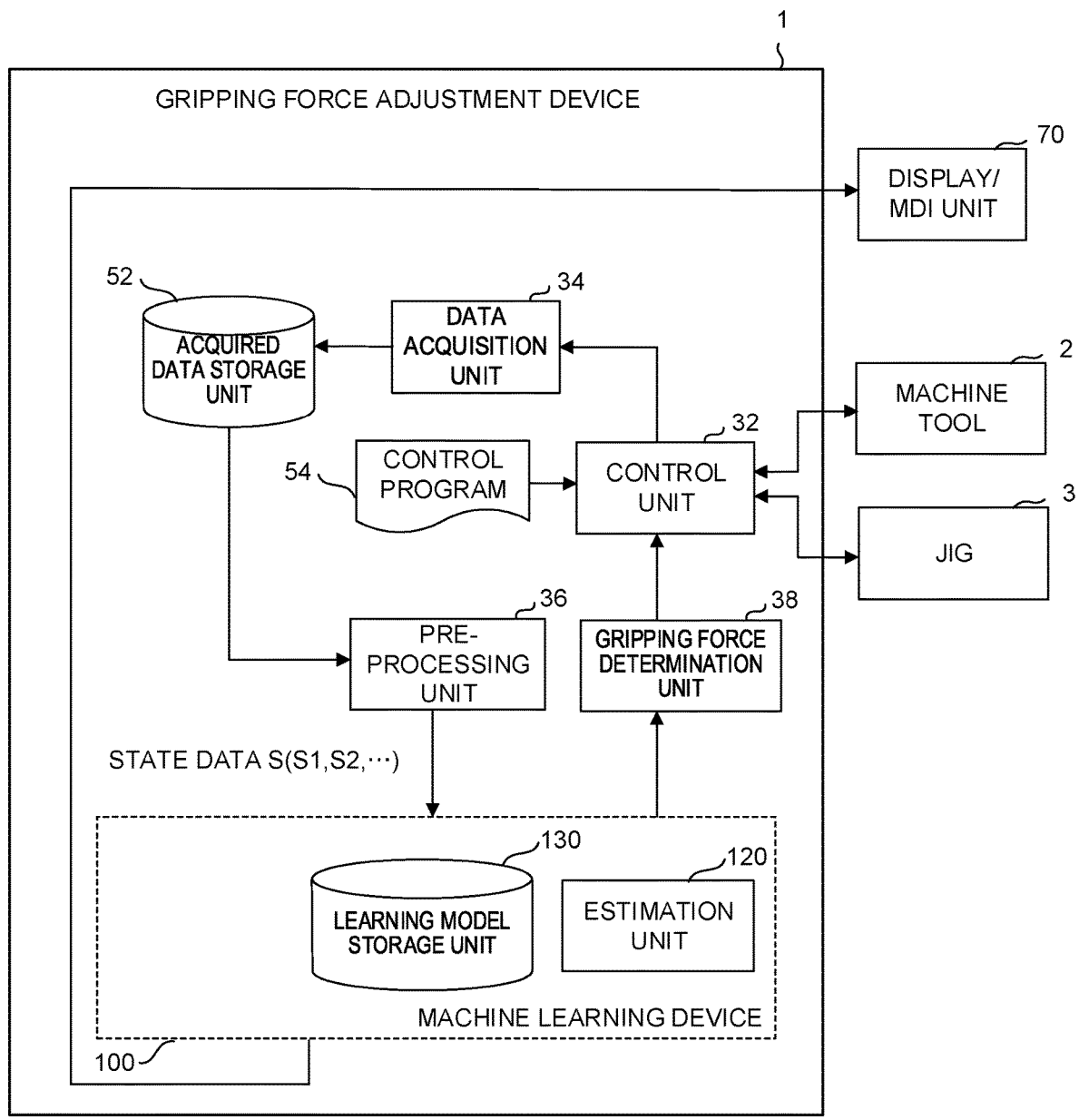
FIG. 5 is a schematic function block diagram of a gripping force adjustment device according to a fourth embodiment.

FIG. 5 is a schematic function block diagram of the gripping force adjustment device 1 and the machine learning device 100 according to a fourth embodiment.

The gripping force adjustment device 1 according to this embodiment includes a configuration (an estimation mode) required for the machine learning device 100 to estimate evaluations of respective gripping forces exerted on the workpiece by the jig 3. The function blocks shown in FIG. 5 are implemented by having the CPU 11 of the gripping force adjustment device 1 and the processor 101 of the machine learning device 100, shown in FIG. 1, execute the respective system programs thereof so as to control the operations of the respective parts of the gripping force adjustment device 1 and the machine learning device 100.

The gripping force adjustment device 1 according to this embodiment includes the control unit 32, the data acquisition unit 34, the pre-processing unit 36, and the gripping force determination unit 38. The machine learning device 100 provided in the gripping force adjustment device 1 includes the estimation unit 120. Further, the acquired data storage unit 52 for storing the data acquired from the machine tool 2, the jig 3, and so on is provided in the nonvolatile memory 14 shown in FIG. 1, and the learning model storage unit 130 for storing the learning model constructed in the machine learning executed by the learning unit 110, as described in the first embodiment, is provided in the nonvolatile memory 104 of the machine learning device 100 shown in FIG. 1.

The control unit 32 and the data acquisition unit 34 according to this embodiment have similar functions to the control unit 32 and the data acquisition unit 34 of the second embodiment (FIG. 3).

The pre-processing unit 36 according to this embodiment creates the state data S in a predetermined format used during estimation by the machine learning device 100 by converting (digitizing, sampling, or the like) the data acquired by the data acquisition unit 34 into a unified format handled by the machine learning device 100 at the stage of estimating evaluations of the respective gripping forces exerted on the workpiece by the jig 3 using the learning model generated by the machine learning device 100. The pre-processing unit 36 according to this embodiment creates the tool data S1, the machining condition data S2, the workpiece data S3, the jig data S4, and the machining step data S5 as the state data S on the basis of the data acquired by the data acquisition unit 34.

The estimation unit 120 according to this embodiment estimates evaluations of the respective gripping forces exerted on the workpiece by the jig 3 using the learning model stored in the learning model storage unit 130 on the basis of the state data S created by the pre-processing unit 36. The estimation unit 120 of this embodiment estimates and outputs the appropriate gripping force to be exerted on the workpiece by the jig 3 by inputting the state data S input therein from the pre-processing unit 36 into the learning model generated by (having parameters determined by) the learning unit 110. The estimation result acquired by the estimation unit 120 is output to the gripping force determination unit 38.

The gripping force determination unit 38 according to this embodiment sets the estimation result of the respective gripping forces exerted on the workpiece by the jig 3, estimated by the estimation unit 120, as the gripping force to be exerted on the workpiece by the jig 3 and issues a command to the control unit 32 to adjust the gripping force to the set gripping force.

The gripping force adjustment device 1 according to this embodiment, configured as described above, is capable of adjusting the gripping force exerted on the workpiece by the jig 3 to the minimum force at which the workpiece can be fixed sufficiently.

Figure 6:
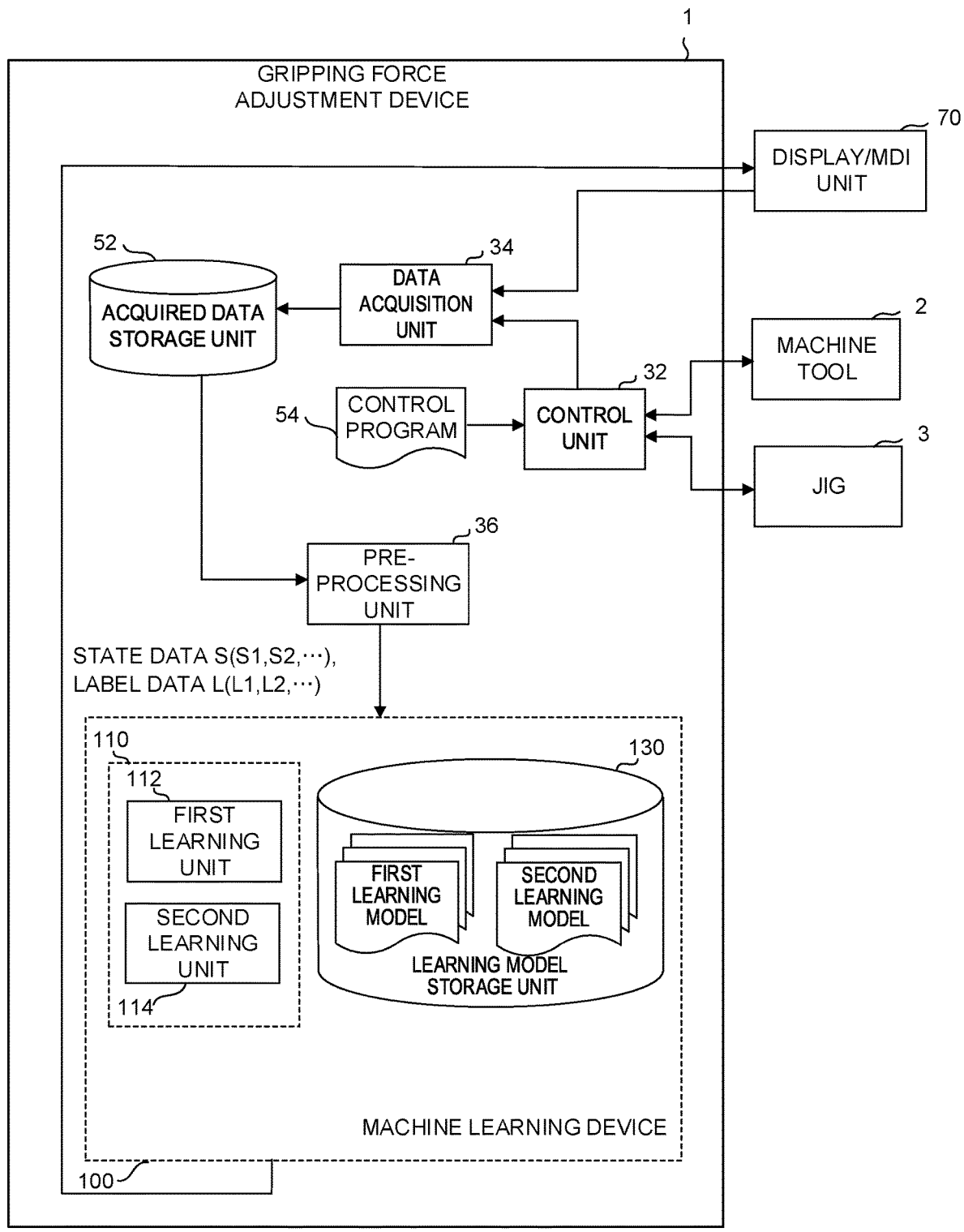
FIG. 6 is a schematic function block diagram of a gripping force adjustment device according to a fifth embodiment.

FIG. 6 is a schematic function block diagram of the gripping force adjustment device 1 and the machine learning device 100 according to a fifth embodiment.

Figure 10:
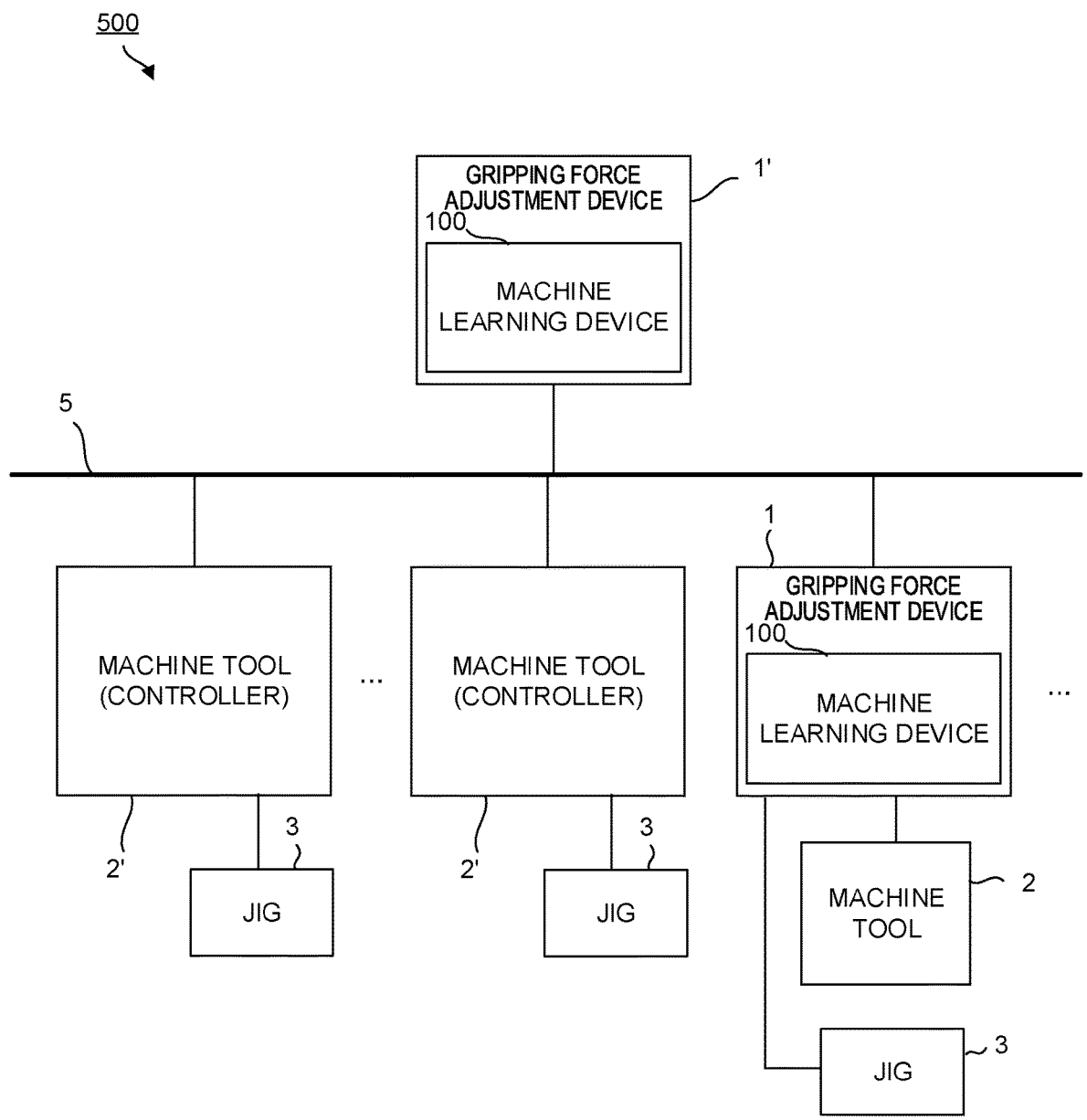
FIG. 10 is a schematic view showing a configuration of a gripping force adjustment system according to a seventh embodiment.

The gripping force adjustment device 1 according to this embodiment includes a configuration (a learning mode) required for the machine learning device 100 to perform supervised learning. The function blocks shown in FIG. 10 are implemented by having the CPU 11 of the gripping force adjustment device 1 and the processor 101 of the machine learning device 100, shown in FIG. 1, execute the respective system programs thereof so as to control the operations of the respective parts of the gripping force adjustment device 1 and the machine learning device 100.

The gripping force adjustment device 1 according to this embodiment includes the control unit 32, the data acquisition unit 34, and the pre-processing unit 36. The machine learning device 100 provided in the gripping force adjustment device 1 includes the learning unit 110, which includes a first learning unit 112 and a second learning unit 114. Further, the acquired data storage unit 52 for storing the data acquired from a machine tool 2, the jig 3, and so on is provided in the nonvolatile memory 14 shown in FIG. 1, and the learning model storage unit 130 for storing learning models constructed by the first learning unit 112 and the second learning unit 114 through machine learning is provided in the nonvolatile memory 104 of the machine learning device 100 shown in FIG. 1.

The control unit 32, the data acquisition unit 34, and the pre-processing unit 36 according to this embodiment have similar functions to the control unit 32, the data acquisition unit 34, and the pre-processing unit 36 of the first embodiment (FIG. 2).

The learning unit 110 according to this embodiment includes the first learning unit 112 and the second learning unit 114.

The first learning unit 112, similarly to the learning unit 110 described in the first embodiment (FIG. 2), performs machine learning using the learning data created by the pre-processing unit 36 so as to generate a first learning model on which the evaluation of the gripping force exerted on the workpiece by the jig 3 and the machining state realized by the machine tool 2 and the gripping state realized on the workpiece by the jig 3 are learned in association with each other. The first learning model generated by the first learning unit 112 is used to estimate whether or not the gripping force exerted on the workpiece by the jig 3 is sufficient in a given state of the machining state realized by the machine tool 2 and the gripping state realized on the workpiece by the jig 3.

The second learning unit 114, similarly to the learning unit 110 described in the third embodiment (FIG. 2), performs machine learning using the learning data so as to generate a second learning model on which the gripping force exerted on the workpiece by the jig 3 and the machining state realized by the machine tool 2 and the gripping state realized on the workpiece by the jig 3 are learned in association with each other. The second learning unit 114 generates the second learning model by analyzing a learning result acquired from the first learning model generated by the first learning unit 112 and executing machine learning based on the analysis result. The second learning unit 114 executes similar processing to that executed by the gripping force determination unit 38 described in the second embodiment (FIG. 3), for example, on the first learning model in order to retrieve the minimum gripping force exerted on the workpiece at which an estimation result indicating that "the gripping force is sufficient" is acquired in relation to the states of the machine tool 2 and the jig 3. The second learning unit 114 generates the second learning model by performing machine learning using the states of the machine tool 2 and the jig 3 and the retrieved gripping force exerted on the workpiece.

The gripping force adjustment device 1 according to this embodiment uses the first learning model, which is generated using a similar machine learning method to that of the learning unit 110 provided in the gripping force adjustment device 1 according to the first embodiment (FIG. 2), to generate learning data to be used in a similar machine learning method to that of the learning unit 110 provided in the gripping force adjustment device 1 according to the third embodiment (FIG. 2), and generates the second learning model using the generated learning data. With the gripping force adjustment device 1 according to the first embodiment (FIG. 1), the learning data can be created and learning can be performed comparatively easily, but it is necessary to implement retrieval processing to determine the gripping force to be exerted on the workpiece by the jig 3 using the completed learning model. With the gripping force adjustment device 1 according to the third embodiment (FIG. 2), meanwhile, a more appropriate gripping force to be exerted on the workpiece by the jig 3 can be estimated directly using the learning model, but it is difficult to collect the learning data. The gripping force adjustment device 1 according to this embodiment combines these two learning methods, and therefore the learning data can be collected comparatively easily, and the collected learning data can be used to generate a learning model from which a more appropriate gripping force to be exerted on the workpiece by the jig 3 can be estimated directly. The learning model (the second learning model) generated in this manner can be used by the gripping force adjustment device 1 according to the fourth embodiment (FIG. 5), for example, to estimate the gripping force to be exerted on the workpiece by the jig 3.

Figure 7:
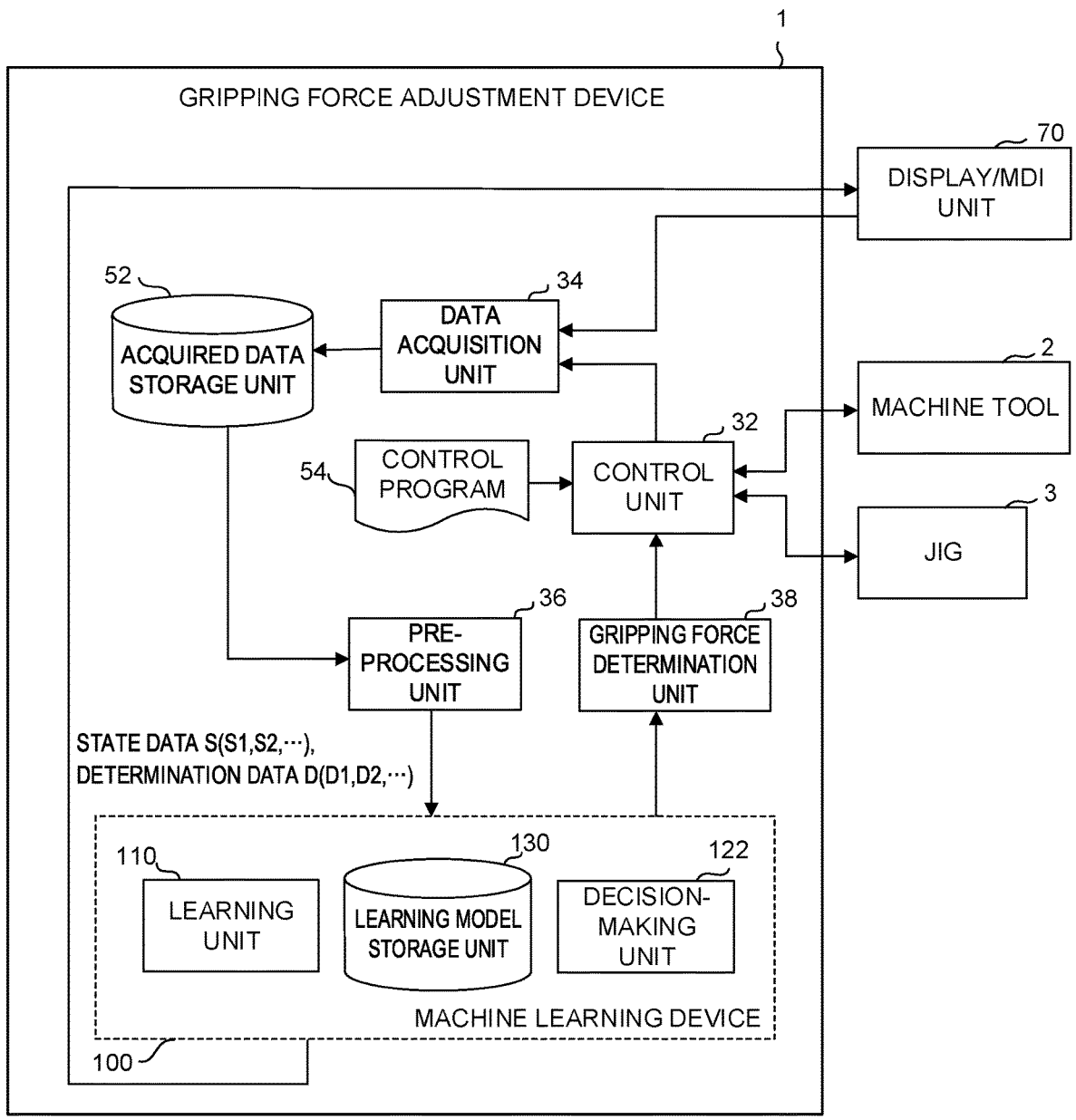
FIG. 7 is a schematic function block diagram of a gripping force adjustment device according to a sixth embodiment.

FIG. 7 is a schematic function block diagram of the gripping force adjustment device 1 and the machine learning device 100 according to a sixth embodiment.

The function blocks shown in FIG. 7 are implemented by having the CPU 11 of the gripping force adjustment device 1 and the processor 101 of the machine learning device 100, shown in FIG. 1, execute the respective system programs thereof so as to control the operations of the respective parts of the gripping force adjustment device 1 and the machine learning device 100.

The gripping force adjustment device 1 according to this embodiment includes the control unit 32, the data acquisition unit 34, and the pre-processing unit 36, while the machine learning device 100 provided in the gripping force adjustment device 1 includes the learning unit 110 and a decision-making unit 122. Further, the acquired data storage unit 52 for storing the data acquired from the machine tool 2, the jig 3, and so on is provided in the nonvolatile memory 14 shown in FIG. 1, and the learning model storage unit 130 for storing the learning model constructed in the machine learning executed by the learning unit 110 is provided in the nonvolatile memory 104 of the machine learning device 100 shown in FIG. 1.

The control unit 32 and the data acquisition unit 34 according to this embodiment have similar functions to the control unit 32 and the data acquisition unit 34 of the first embodiment (FIG. 2).

In a case where the machine learning device 100 performs reinforcement learning, the pre-processing unit 36 according to this embodiment creates a set of the state data S and determination data D in the predetermined format of the learning as learning data. As the state data S, the pre-processing unit 36 creates the tool data S1, the machining condition data S2, the workpiece data S3, the jig data S4, the machining step data S5, and the gripping force data S6. Further, as the determination data D, the pre-processing unit 36 creates fixing force determination data D1, which are data for determining whether the workpiece is being gripped by the jig 3 by the maximum gripping force for fixing the workpiece in the machining state in which the state data S were acquired, and precision determination data D2, which are data for determining whether the gripping force is gentle enough to ensure that the workpiece is not deformed by being distorted, warped, or the like by the jig 3.

The fixing force determination data D1 are defined as data serving as a reference for determining whether or not the gripping force exerted on the workpiece is sufficiently large. The fixing force determination data D1 may be data indicating whether, as a result of adjusting the gripping force exerted on the workpiece by the jig 3, phenomena such as the workpiece shifting or vibrating during machining have stopped occurring, for example. The fixing force determination data D1 may be created on the basis of an input operation performed by the operator using the display/MDI unit 70 while observing the machining condition of the workpiece during machining by the machine tool 2, for example, or may be created by detecting activity such as shifting or vibration on the basis of the voltage values or current values of the motors used to drive the respective axes of the machine tool 2 and so on, the voltage value/current value of the motor used to drive the jig 3 and so on, a value measured by a separately attached vibration sensor for detecting workpiece vibration and so on, or the like. The fixing force determination data D1 may be data including a degree of shifting or vibration occurring in the workpiece gripped by the jig 3.

The precision determination data D2 are defined as data serving as a reference for determining whether or not deformation such as distortion or warping has occurred in the workpiece. The precision determination data D2 may be created on the basis of an input operation performed by the operator using the display/MDI unit 70 while observing the machining condition of the workpiece during machining by the machine tool 2, for example. Alternatively, for example, variation in a predetermined position on the workpiece may be measured using a non-contact distance sensor or the like attached to the machine tool 2, and the precision determination data D2 may be created on the basis of the measurement result. For example, precision determination data D2 may be created so as to indicate that distortion has occurred in case where displacement occurs in the distance of the predetermined position on the workpiece from a fixed point after adjusting the gripping force exerted on the workpiece by the jig 3, and indicate that the gripping force is appropriate in case where displacement has not occurred. Further, the precision determination data D2 may be data including a degree of distortion or warping occurring in the workpiece gripped by the jig 3.

The learning unit 110 according to this embodiment performs machine learning using the learning data created by the pre-processing unit 36. Using a well-known reinforcement learning method, the learning unit 110 generates a learning model on which an adjustment action to be implemented on the gripping force exerted on the workpiece by the jig 3 is learned in relation to the machining state realized by the machine tool 2 and the gripping state realized on the workpiece by the jig 3, and stores the generated learning model in the learning model storage unit 130. Reinforcement learning is a method of repeating, in a trial-and-error fashion, a cycle of observing the current state (in other words, input) of an environment in which a learning subject exists, executing a predetermined action (in other words, output) in the current state, and rewarding the action in some way, and then learning a measure (in the machine learning device 100 of the present application, an adjustment action to be implemented on the gripping force exerted on the workpiece by the jig 3) with which the maximum total reward is obtained as an optimal solution. Q-learning or the like may be cited as an example of the reinforcement learning method implemented by the learning unit 110.

During the Q-learning implemented by the learning unit 110, a reward R can be set as a positive (plus) reward R when the fixing force determination data D1 indicate that "no shifting or vibration has occurred" and as a negative (minus) reward R when the fixing force determination data D1 indicate that "shifting or vibration has occurred". Further, the reward R can be set as a positive (plus) reward R when the precision determination data D2 indicate that "the gripping force is appropriate" and as a negative (minus) reward R when the precision determination data D2 indicate that "distortion has occurred". Furthermore, the reward R may be set as a larger positive (plus) reward R or negative (minus) reward R in accordance with the degree indicated by the fixing force determination data D1 or the precision determination data D2.

The learning unit 110 may be configured to use a neural network as a value function Q (a learning model), input the state data S and an action a into the neural network, and output a value (a result y) of the action a in the corresponding state. When this configuration is employed, a neural network having three layers, namely an input layer, an intermediate layer, and an output layer, may be used as the learning model, but by employing a so-called deep learning method using a neural network with three or more layers, learning and inference can be implemented more effectively. The learning model generated by the learning unit 110 is stored in the learning model storage unit 130 provided in the nonvolatile memory 104 and used by the decision-making unit 122 to determine the adjustment action to be implemented on the gripping force exerted on the workpiece by the jig 3.

Note that although the learning unit 110 is an essential configuration at the learning stage, the learning unit 110 is not necessarily an essential configuration once the learning unit 110 has finished learning the evaluation of the gripping force exerted on the workpiece by the jig 3. In a case where the machine learning device 100 is shipped to a customer after learning is completed or the like, for example, the machine learning device 100 may be shipped after removing the learning unit 110.

The decision-making unit 122 is implemented by having the processor 101 provided in the gripping force adjustment device 1 shown in FIG. 1 execute the system program read from the ROM 102 so that mainly, the processor 101 executes calculation processing using the RAM 103 and the nonvolatile memory 104. The decision-making unit 122 determines the optimal solution of the adjustment action to be implemented on the gripping force exerted on the workpiece by the jig 3 on the basis of the state data S input therein from the pre-processing unit 36 using the learning model stored in the learning model storage unit 130, and outputs the determined adjustment action to be implemented on the gripping force exerted on the workpiece by the jig 3. In the decision-making unit 122 of this embodiment, by inputting the state data S (the tool data S1, the machining condition data S2, the workpiece data S3, the jig data S4, the machining step data S5, and the gripping force data S6) input therein from the pre-processing unit 36 and the adjustment action to be implemented on the gripping force exerted on the workpiece by the jig 3 (the determined gripping force to be exerted on the workpiece by the jig 3) as input data into the learning model generated by (having parameters determined by) the learning unit 110 during reinforcement learning, the reward acquired by performing the action in the current state can be calculated, and by calculating the reward in relation to the adjustment actions that can be taken at present in relation to the gripping force exerted on the workpiece and comparing the plurality of calculated rewards, the calculated adjustment action that results in the largest reward when implemented on the gripping force exerted on the workpiece by the jig 3 is determined to be the optimal solution. The optimal solution to the adjustment action to be implemented on the gripping force exerted on the workpiece by the jig 3, determined by the decision-making unit 122, may be used to determine the gripping force to be exerted on the workpiece by the jig 3, which is input into the gripping force determination unit 38, and also used by being displayed on and output by the display/MDI unit 70, or transmitted to and output by a fog computer, a cloud computer, or the like over a wired or wireless network, not shown in the figures, for example.

In the gripping force adjustment device 1 configured as described above, the gripping force exerted on the workpiece by the jig 3 can be adjusted appropriately in the operation environment of the machine tool 2 and the jig 3.

In seventh to ninth embodiments to be described below, the gripping force adjustment device 1 according to the first to sixth embodiments is packaged as part of a system in which a plurality of devices, including a cloud server or a host computer, a fog computer, and an edge computer (a robot controller, a controller, or the like) are connected to each other over a wired or wireless network.

Figure 8:
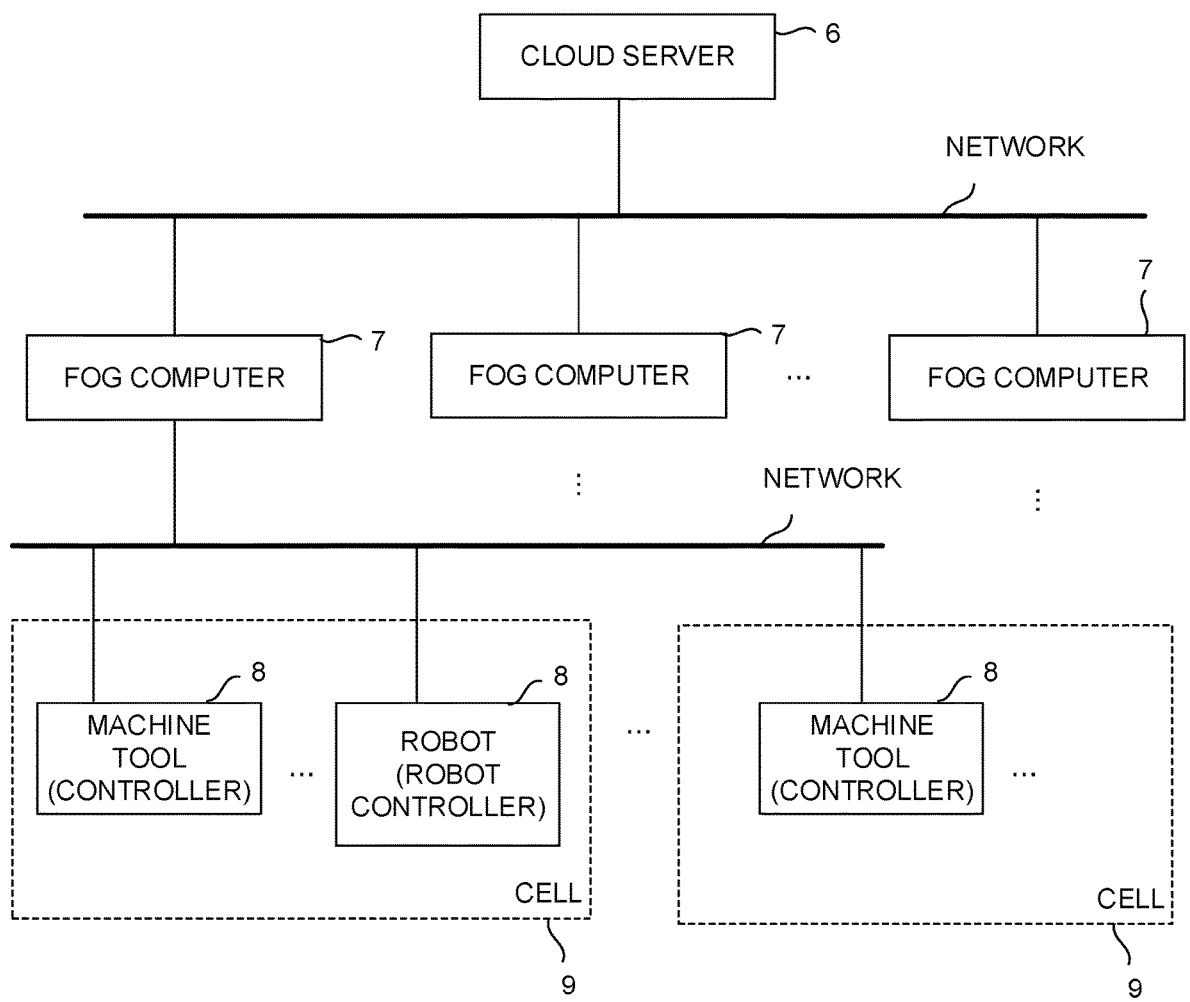
FIG. 8 is a view showing an example of a system having a three-layer structure including a cloud server, a fog computer, and an edge computer.

As shown in FIG. 8, in the seventh to ninth embodiments described below, a system configured such that a plurality of devices, when connected to the network, are logically divided into three layers, namely a layer including a cloud server 6 and so on, a layer including a fog computer 7 and so on, and a layer including an edge computer 8 (a robot controller, a controller, or the like included in a cell 9) and so on, is envisaged. In this system, the gripping force adjustment device 1 according to an aspect of the present invention can be packaged in any of the cloud server 6, the fog computer 7, and the edge computer 8 in order to implement learning, in which the data used in the machine learning-related processing are shared among the plurality of devices over the network, large-scale analysis, in which generated learning models are collected in the fog computer 7 or the cloud server 6, sharing and recycling of the generated learning models, and so on.

In the system shown in FIG. 8, a plurality of cells 9 are provided in factories in respective locations, and the upper-layer fog computer 7 manages the cells 9 in predetermined units (factory units, units of a plurality of factories owned by the same manufacturer, and so on). The data collected and analyzed by the fog computer 7 can further be collected, analyzed, and so on by the upper-layer cloud server 6, and information acquired by analyzing the collected data can be used to control the respective edge computers 8 and so on.

Figure 9:
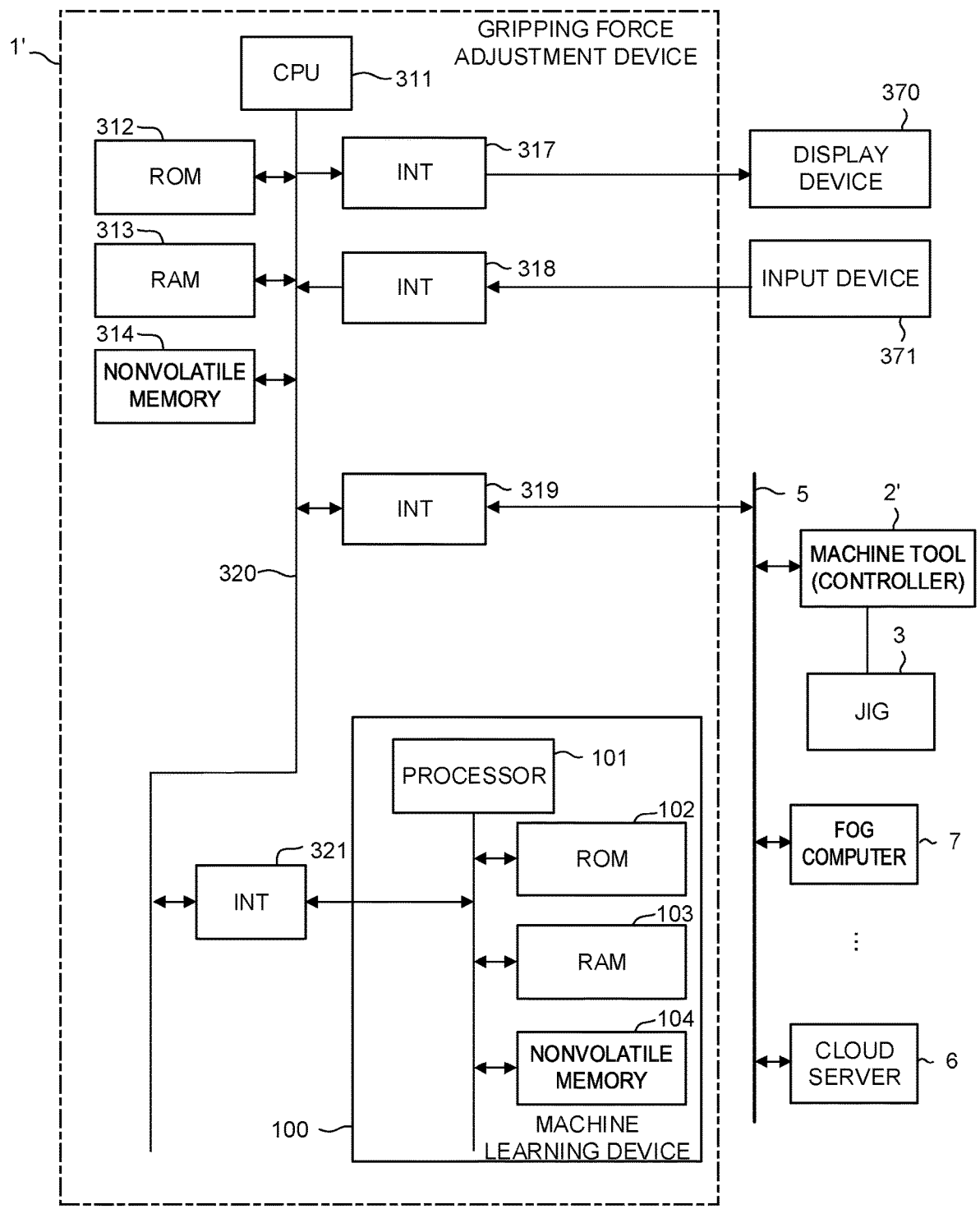
FIG. 9 is a schematic view showing a hardware configuration of a gripping force adjustment device when packaged in a computer.

FIG. 9 is a schematic view showing the hardware configuration of the gripping force adjustment device when packaged in a computer such as a cloud server or a fog computer.

A CPU 311 provided in a computer-packaged gripping force adjustment device 1' according to this embodiment is a processor for executing overall control of the gripping force adjustment device 1'. The CPU 311 reads a system program stored in a ROM 312 via a bus 320 and executes overall control of the gripping force adjustment device 1' in accordance with the system program. Temporary calculation data and display data, various data input by an operator using an input unit, not shown in the figure, and so on are stored temporarily in a RAM 313.

A nonvolatile memory 314 is formed, for example, from a memory that is backed up by a battery (not shown) or the like so that the storage state thereof is maintained even after a power supply of the gripping force adjustment device 1' is switched OFF. A program input via an input device 371 and various data acquired from respective parts of the gripping force adjustment device 1' or from a robot over a network 5 are stored in the nonvolatile memory 314. The programs and various data stored in the nonvolatile memory 314 may be expanded in the RAM 313 during execution/use. Further, various system programs (including a system program for controlling communication with the machine learning device 100, to be described below), such as a well-known analysis program, are written to the ROM 312 in advance.

The gripping force adjustment device 1' is connected to the wired or wireless network 5 via an interface 319. At least one machine tool 2' (a machine tool having a controller), another gripping force adjustment device 1, the edge computer 8, the fog computer 7, the cloud server 6, and so on are connected to the network 5 in order to exchange data with the gripping force adjustment device 1'.

Data read from a memory, data acquired as a result of executing a program or the like, and so on are output to and displayed on a display device 370 via an interface 317.

Further, the input device 371, which is constituted by a keyboard, a pointing device, or the like transmits commands, data, and so on based on operations by the operator to the CPU 311 via an interface 318.

An interface 321 is an interface for connecting the gripping force adjustment device 1' to the machine learning device 100. The machine learning device 100 has a similar configuration to the machine learning device 100 illustrated in FIG. 1.

When the gripping force adjustment device 1' is packaged in a computer such as the cloud server 6 or the fog computer 7 in this manner, the functions of the gripping force adjustment device 1' are similar to those of the gripping force adjustment device 1 according to the first to sixth embodiments, except that information is acquired from the machine tool 2' and the jig 3 and commands to adjust the gripping force are issued to the jig 3 over the network 5. In this case, the machine tool 2' includes a controller, and therefore the control unit 32 provided in the gripping force adjustment device 1' acquires information relating to the machining state realized by the machine tool 2' from the controller provided in the machine tool 2' instead of controlling the machine tool 2'. Further, the control unit 32 provided in the gripping force adjustment device 1' indirectly controls the jig 3 via the controller provided in the machine tool 2' and acquires the gripping force exerted by the jig 3 via the controller provided in the machine tool 2'.

FIG. 10 is a schematic view showing a configuration of a gripping force adjustment system according to a seventh embodiment, including the gripping force adjustment device 1'.

A gripping force adjustment system 500 includes a plurality of gripping force adjustment devices 1, 1', a plurality of machine tools 2', and the network 5, which connects the gripping force adjustment devices 1, 1' and the machine tools 2' to each other.

In the gripping force adjustment system 500, the gripping force adjustment device 1' provided with the machine learning device 100 adjusts the gripping force exerted on the workpiece by the jig 3, which serves as an adjustment subject, on the basis of the machining state realized by the machine tools 2' and the gripping state realized on the workpiece by the jig 3 using the learning result acquired by the learning unit 110. Further, at least one gripping force adjustment device 1' may be configured to learn an adjustment to be applied to the gripping force exerted on the workpiece by the jig 3 with respect to the machining state realized by the machine tools 2, 2' and the gripping state realized on the workpiece by the jig 3, the adjustment being common to all of the gripping force adjustment devices 1, 1', on the basis of the state variables and the label data L or determination data D acquired by the other plurality of gripping force adjustment devices 1, 1', and share the learning result with all of the gripping force adjustment devices 1, 1'. According to the gripping force adjustment system 500, therefore, a more varied data set (including the state variables S and the label data L or determination data D) can be input, and as a result, the speed and reliability of the learning can be improved.

Figure 11:
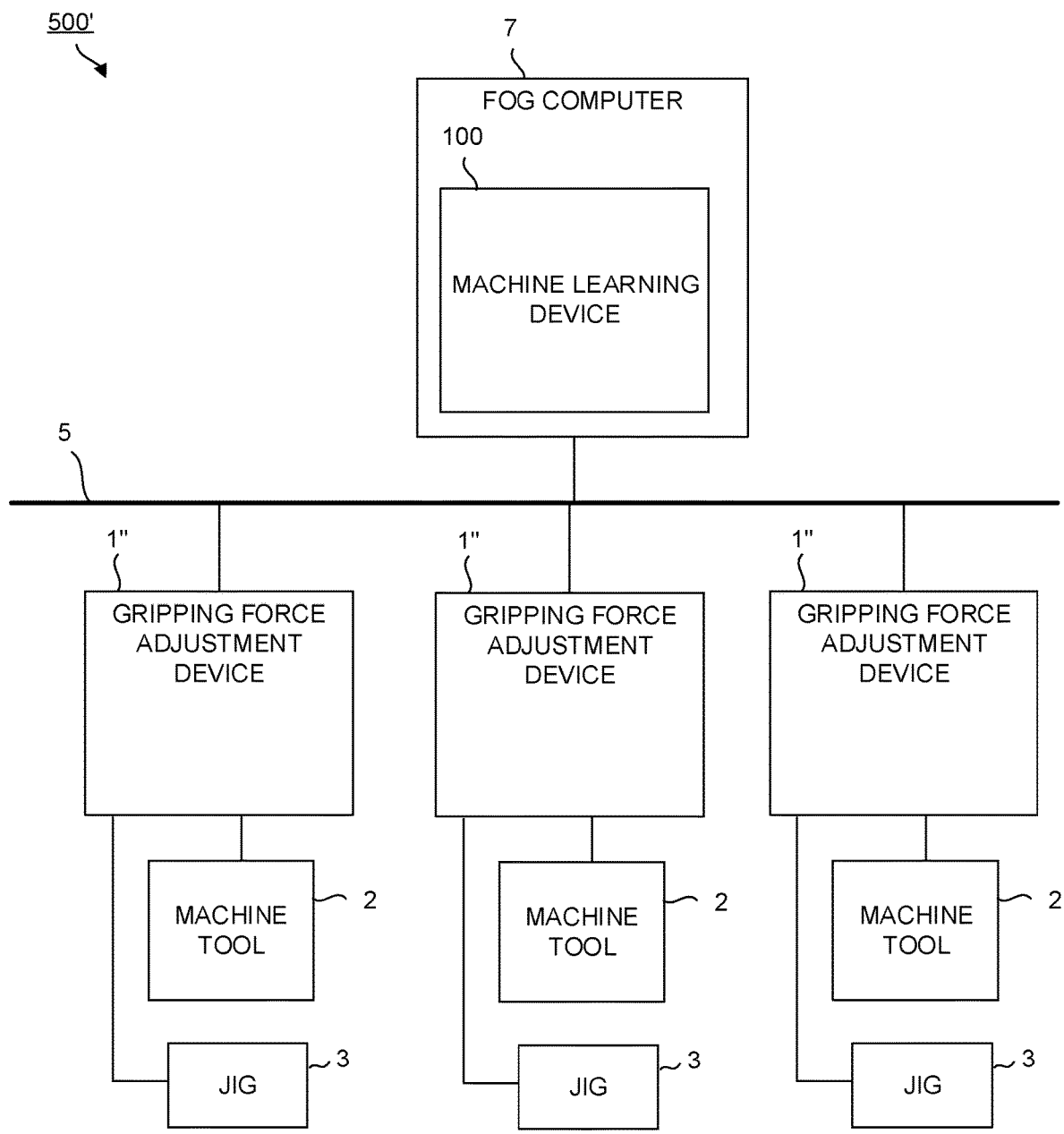
FIG. 11 is a schematic view showing a configuration of a gripping force adjustment system according to an eighth embodiment.

FIG. 11 is a schematic view showing a configuration of a system according to an eighth embodiment, in which the machine learning device and the gripping force adjustment device are packaged in different devices.

A gripping force adjustment system 500' includes at least one machine learning device 100 packaged as part of a computer such as a cloud server, a host computer, or a fog computer (FIG. 11 shows an example in which the machine learning device 100 is packaged as part of the fog computer 7), a plurality of gripping force adjustment devices 1", and the network 5, which connects the gripping force adjustment devices 1" to the computer. Note that in the hardware configuration of the computer, similarly to the schematic hardware configuration of the gripping force adjustment device 1', shown in FIG. 9, hardware typically provided in a computer, such as the CPU 311, the RAM 313, and the nonvolatile memory 314, is connected via the bus 320.

In the gripping force adjustment system 500' having the above configuration, the machine learning device 100 can learn the adjustment to be applied to the gripping force exerted on the workpiece by the jig 3 with respect to the machining state realized by the machine tool 2 and the gripping state realized on the workpiece by the jig 3, the adjustment being common to all of the gripping force adjustment devices 1", on the basis of the state variables S and the label data L or determination data D acquired by each of the plurality of gripping force adjustment devices 1", and adjust the gripping force exerted on the workpiece by the jig 3 using the learning result. With the gripping force adjustment system 500' thus configured, the required number of gripping force adjustment devices 1" can be connected to the machine learning device 100 when required, regardless of the locations and periods in which the plurality of gripping force adjustment devices 1" exist.

Figure 12:
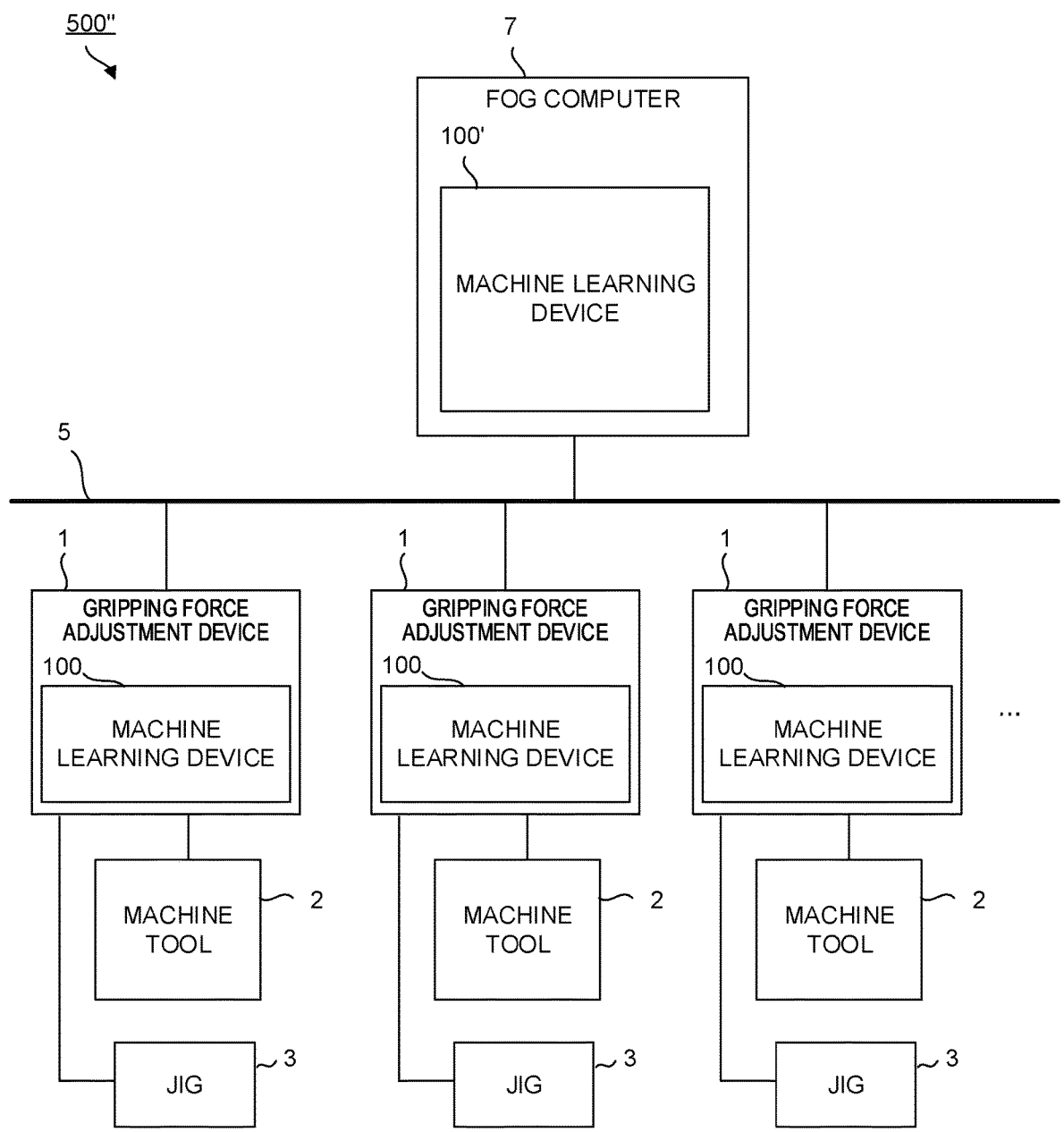
FIG. 12 is a schematic view showing a configuration of a gripping force adjustment system according to a ninth embodiment.

FIG. 12 is a schematic view showing a configuration of a gripping force adjustment system 500" according to a ninth embodiment, including a machine learning device 100' and the gripping force adjustment device 1.

The gripping force adjustment system 500" includes at least one machine learning device 100' packaged in a computer such as an edge computer or a fog computer, a host computer, or a cloud server (FIG. 12 shows an example in which the machine learning device 100' is packaged as part of the fog computer 7), a plurality of gripping force adjustment devices 1, and the wired or wireless network 5 that connects the plurality of gripping force adjustment devices 1 to the computer.

In the gripping force adjustment system 500" having the above configuration, the fog computer 7 including the machine learning device 100' acquires a learning model from each gripping force adjustment device 1, the learning model being acquired as a result of the machine learning executed by the machine learning device 100 provided in each gripping force adjustment device 1. The machine learning device 100' provided in the fog computer 7 generates a new, optimized and streamlined learning model by executing optimization and streamlining processing on knowledge based on the plurality of learning models, and distributes the generated learning model to the respective gripping force adjustment devices 1.

Generating a distilled model based on the plurality of learning models acquired from the gripping force adjustment devices 1 may be cited as an example of the optimization and streamlining executed on the learning models by the machine learning device 100'. In this case, the machine learning device 100' according to this embodiment creates input data to be input into the learning models, and generates a new learning model (a distilled model) by implementing learning from scratch using the output acquired as a result of inputting the input data into the respective learning models. As already described above, the distilled model generated in this manner is put to use by being distributed to the gripping force adjustment devices 1 and other computers via an external storage medium or the network 5.

In another example of the optimization and streamlining executed on the learning models by the machine learning device 100', during the process for distilling the plurality of learning models acquired from the respective gripping force adjustment devices 1, the distribution of the output data acquired from the learning models in response to the input data may be analyzed using a typical statistical method, outliers may be extracted from sets of input data and output data, and distillation may be performed using the sets of input data and output data from which the outliers have been removed. By implementing this process, exceptional estimation results can be excluded from the sets of input data and output data acquired from the respective learning models, and as a result, a distilled model can be generated using sets of input data and output data from which the exceptional estimation results have been removed. The distilled model generated in this manner can be put to use as a more generic learning model than the learning models generated by the plurality of gripping force adjustment devices 1.

Note that other typical learning model optimizing and streamlining methods (analyzing each learning model and optimizing the hyperparameters of the learning models on the basis of the analysis results, or the like) may also be introduced as appropriate.

In the gripping force adjustment system 500" according to this embodiment, by disposing the machine learning device 100' in the fog computer 7 provided in relation to the plurality of gripping force adjustment devices 1 constituted by edge computers, for example, aggregating and storing the learning models generated respectively by the gripping force adjustment devices 1 on the fog computer 7, and executing optimization and streamlining based on the stored plurality of learning models, an operation for redistributing an optimized and streamlined learning model to each of the gripping force adjustment devices 1 as required can be performed.

Further, in the gripping force adjustment system 500" according to this embodiment, the learning models aggregated and stored on the fog computer 7, for example, and the learning model that is optimized and streamlined by the fog computer 7 can be collected on a host computer or a cloud server on an even higher layer, and these learning models can be applied to intellectual work (construction and redistribution of an even more generic learning model in an upper-layer server, assistance during maintenance work based on an analysis result acquired from the learning model, analysis of the performance and so on of each gripping force adjustment device 1, application to the development of new machines, and so on) undertaken in a factory or by the manufacturer of the gripping force adjustment device 1.

Embodiments of the present invention were described above, but the present invention is not limited to the above embodiments alone and may be implemented in various forms by applying appropriate modifications thereto.

For example, in the above embodiments, the gripping force adjustment device 1 and the machine learning device 100 are described as devices having different CPUs (processors), but the machine learning device 100 may be implemented by the CPU 11 provided in the gripping force adjustment device 1 and the system program stored in the ROM 12.

The invention claimed is:

1. A gripping force adjustment device for adjusting a gripping force exerted on a workpiece by a jig for fixing the workpiece in a machine tool that machines the workpiece, the gripping force adjustment device comprising:

a data acquisition unit configured to acquire at least first data indicating a machining state sensed by the machine tool and second data relating to a gripping state sensed on the workpiece by the jig;

a pre-processing unit configured to create further data to be used in machine learning based on the first and second data acquired by the data acquisition unit; and a machine learning device configured to execute, based on further data created by the pre-processing unit, machine learning processing relating to the gripping force exerted on the workpiece by the jig in an environment in which the machine tool machines the workpiece.

2. The gripping force adjustment device according to claim 1, wherein the pre-processing unit is configured to create, as data to be used in supervised learning executed by the machine learning device, state data including at least (i) tool data including information relating to a tool used in the machining performed on the workpiece by the machine tool, (ii) machining condition data including information relating to machining conditions of the machining performed on the workpiece by the machine tool, (iii) workpiece data including information relating to the workpiece machined by the machine tool, (iv) jig data including information relating to a type of the jig, (v) machining step data including information relating to machining steps implemented on the workpiece by the machine tool, and (vi) gripping force data including information relating to the gripping force exerted on the workpiece by the jig, and label data including at least gripping force suitability data indicating a suitability of the gripping force exerted on the workpiece by the jig, and the machine learning device comprises a learning unit configured to generate, based on the state data and the label data, a learning model on which the machining state and the gripping state are associated with the suitability of the gripping force exerted on the workpiece by the jig.

3. The gripping force adjustment device according to claim 1, wherein the pre-processing unit is configured to create, as data to be used in an estimation executed by the machine learning device, state data including at least (i) tool data including information relating to a tool used in the machining performed on the workpiece by the machine tool, (ii) machining condition data including information relating to machining conditions of the machining performed on the workpiece by the machine tool, (iii) workpiece data including information relating to the workpiece machined by the machine tool, (iv) jig data including information relating to a type of the jig, (v) machining step data including information relating to machining steps implemented on the workpiece by the machine tool, and (vi) gripping force data including information relating to the gripping force exerted on the workpiece by the jig, the machine learning device comprises:

a learning model storage unit that stores a learning model on which the machining state and the gripping state associated with a suitability of the gripping force exerted on the workpiece by the jig, and an estimation unit configured to estimate the suitability of the gripping force exerted on the workpiece by the jig based on the state data using the learning model stored in the learning model storage unit, and the gripping force adjustment device further comprises a gripping force determination unit configured to
retrieve a minimum workpiece gripping force that is estimated to be suitable by the estimation unit, and
set the retrieved minimum workpiece gripping force as the gripping force to be exerted on the workpiece by the jig.

4. The gripping force adjustment device according to claim 1, wherein
the pre-processing unit is configured to create, as data to be used in supervised learning executed by the machine learning device,
state data including at least (i) tool data including information relating to a tool used in the machining performed on the workpiece by the machine tool, (ii) machining condition data including information relating to machining conditions of the machining performed on the workpiece by the machine tool, (iii) workpiece data including information relating to the workpiece machined by the machine tool, (iv) jig data including information relating to a type of the jig, and (v) machining step data including information relating to machining steps implemented on the workpiece by the machine tool, and
label data including at least appropriate gripping force data including information relating to the gripping force exerted on the workpiece by the jig, and
the machine learning device comprises a learning unit configured to generate, based on the state data and the label data, a learning model on which the machining state and the gripping state are associated with the gripping force exerted on the workpiece by the jig.

5. The gripping force adjustment device according to claim 1, wherein
the pre-processing unit is configured to create, as data to be used in an estimation executed by the machine learning device, state data including at least (i) tool data including information relating to a tool used in the machining performed on the workpiece by the machine tool, (ii) machining condition data including information relating to machining conditions of the machining performed on the workpiece by the machine tool, (iii) workpiece data including information relating to the workpiece machined by the machine tool, (iv) jig data including information relating to a type of the jig, and (v) machining step data including information relating to machining steps implemented on the workpiece by the machine tool, the machine learning device includes:
a learning model storage unit that stores a learning model on which the machining state and the gripping state are associated with the gripping force exerted on the workpiece by the jig, and
an estimation unit configured to estimate the gripping force exerted on the workpiece by the jig based on the state data using the learning model stored in the learning model storage unit, and
the gripping force adjustment device further comprises a gripping force determination unit configured to determine the gripping force to be exerted on the workpiece by the jig based on an estimation result acquired by the estimation unit.

6. The gripping force adjustment device according to claim 1, wherein
the pre-processing unit is configured to create, as data to be used in supervised learning executed by the machine learning device,
state data including at least (i) tool data including information relating to a tool used in the machining performed on the workpiece by the machine tool, (ii) machining condition data including information relating to machining conditions of the machining performed on the workpiece by the machine tool, (iii) workpiece data including information relating to the workpiece machined by the machine tool, (iv) jig data including information relating to a type of the jig, (v) machining step data including information relating to machining steps implemented on the workpiece by the machine tool, and (vi) gripping force data including information relating to the gripping force exerted on the workpiece by the jig, and
label data including at least gripping force suitability data indicating a suitability of the gripping force exerted on the workpiece by the jig, and
the machine learning device comprises a learning unit including:
a first learning unit configured to generate, based on the state data and the label data, a first learning model on which the machining state and the gripping state are associated with the suitability of the gripping force exerted on the workpiece by the jig, and
a second learning unit configured to generate, based on a result of estimation processing using the first learning model generated by the first learning unit, a second learning model on which the machining state and the gripping state are associated with the gripping force exerted on the workpiece by the jig.

7. The gripping force adjustment device according to claim 1, wherein
the pre-processing unit is configured to create, as data to be used in reinforcement learning executed by the machine learning device,
state data including at least (i) tool data including information relating to a tool used in the machining performed on the workpiece by the machine tool, (ii) machining condition data including information relating to machining conditions of the machining performed on the workpiece by the machine tool, (iii) workpiece data including information relating to the workpiece machined by the machine tool, (iv) jig data including information relating to a type of the jig, (v) machining step data including information relating to machining steps implemented on the workpiece by the machine tool, and (vi) gripping force data including information relating to the gripping force exerted on the workpiece by the jig, and
determination data including at least fixing force determination data for determining whether or not the workpiece is fixed by the jig and precision determination data for determining whether or not the workpiece has been deformed by the jig,
the machine learning device comprises:
a learning unit configured to generate, based on the state data and the determination data, a learning model on which the machining state and the gripping state are associated with an adjustment action to be implemented on the gripping force exerted on the workpiece by the jig, and
a decision-making unit configured to determine an adjustment to be applied to the gripping force exerted on the workpiece by the jig based on the state data using the learning model generated by the learning unit, and the gripping force adjustment device further includes a gripping force determination unit configured to determine the gripping force to be exerted on the workpiece by the jig based on the determination made by the decision-making unit.

8. A gripping force adjustment system, comprising:
a plurality of devices connected to each other by a network, the plurality of devices including at least a first gripping force adjustment device which is the gripping force adjustment device according to claim 2.

9. The gripping force adjustment system according to claim 8, wherein
the plurality of devices include a computer provided with a further machine learning device,
the computer is configured to acquire at least one learning model generated by learning executed by the learning unit of the first gripping force adjustment device, and
the further machine learning device provided in the computer is configured to execute optimization and streamlining based on the acquired at least one learning model.

10. The gripping force adjustment system according to claim 8, wherein the plurality of devices further include a second gripping force adjustment device that is different from the first gripping force adjustment device, and
the learning unit provided in the first gripping force adjustment device is configured to share a learning result acquired by the learning unit with the second gripping force adjustment device.

11. The gripping force adjustment system according to claim 8, wherein the plurality of devices further include a second gripping force adjustment device that is different from the first gripping force adjustment device, and
the second gripping force adjustment device is configured to provide, via the network, further data observed in the second gripping force adjustment device to be used during learning executed by the learning unit provided in the first gripping force adjustment device.

12. A gripping force adjustment system, comprising:
a plurality of devices connected to each other by a network, the plurality of devices including at least a first gripping force adjustment device which is the gripping force adjustment device according to claim 4.

13. A gripping force adjustment system, comprising:
a plurality of devices connected to each other by a network, the plurality of devices including at least a first gripping force adjustment device which is the gripping force adjustment device according to claim 6.

14. A gripping force adjustment system, comprising:
a plurality of devices connected to each other by a network, the plurality of devices including at least a first gripping force adjustment device which is the gripping force adjustment device according to claim 7.

15. A gripping force adjustment device that adjusts a gripping force exerted on a workpiece by a jig for fixing the workpiece in a machine tool that machines the workpiece, comprising:
a data acquisition unit that acquires at least data indicating a machining state realized by the machine tool and data relating to a gripping state realized on the workpiece by the jig;
a pre-processing unit that creates data to be used in machine learning on the basis of the data acquired by the data acquisition unit; and
a machine learning device that executes, on the basis of the data created by the pre-processing unit, machine learning processing relating to the gripping force exerted on the workpiece by the jig in the environment in which the machine tool machines the workpiece, wherein
the pre-processing unit creates, as data to be used in an estimation executed by the machine learning device,
state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, machining step data including information relating to machining steps implemented on the workpiece by the machine tool, and gripping force data including information relating to the gripping force exerted on the workpiece by the jig, and wherein
the machine learning device comprises:
a learning model storage unit that stores a learning model on which the machining state realized by the machine tool and the gripping state realized on the workpiece by the jig are associated with the suitability of the gripping force exerted on the workpiece by the jig; and
an estimation unit that estimates the suitability of the gripping force exerted on the workpiece by the jig on the basis of the state data using the learning model stored in the learning model storage unit, and wherein
the gripping force adjustment device further comprises a gripping force determination unit that retrieves the minimum workpiece gripping force that is estimated to be suitable by the estimation unit, and sets the retrieved workpiece gripping force as the gripping force to be exerted on the workpiece by the jig.

16. A gripping force adjustment device that adjusts a gripping force exerted on a workpiece by a jig for fixing the workpiece in a machine tool that machines the workpiece, comprising:
a data acquisition unit that acquires at least data indicating a machining state realized by the machine tool and data relating to a gripping state realized on the workpiece by the jig;
a pre-processing unit that creates data to be used in machine learning on the basis of the data acquired by the data acquisition unit; and
a machine learning device that executes, on the basis of the data created by the pre-processing unit, machine learning processing relating to the gripping force exerted on the workpiece by the jig in the environment in which the machine tool machines the workpiece, wherein
the pre-processing unit creates, as data to be used in an estimation executed by the machine learning device,
state data including at least tool data including information relating to a tool used in the machining performed on the workpiece by the machine tool, machining condition data including information relating to machining conditions of the machining performed on the workpiece by the machine tool, workpiece data including information relating to the workpiece machined by the machine tool, jig data including information relating to the type of the jig, and machining step data including information relating to machining steps implemented on the workpiece by the machine tool, and wherein the machine learning device includes:
- a learning model storage unit that stores a learning model on which the machining state realized by the machine tool and the gripping state realized on the workpiece by the jig are associated with the gripping force exerted on the workpiece by the jig; and
- an estimation unit that estimates the gripping force exerted on the workpiece by the jig on the basis of the state data using the learning model stored in the learning model storage unit, and wherein the gripping force adjustment device further comprises a gripping force determination unit that determines the gripping force to be exerted on the workpiece by the jig on the basis of an estimation result acquired by the estimation unit.

* * * * *